United States Patent
Alderson

[11] Patent Number: 6,085,859
[45] Date of Patent: Jul. 11, 2000

[54] RACE CAR

[76] Inventor: Mark L. Alderson, 4056 Locust La., Brownsburg, Ind. 46112

[21] Appl. No.: 09/301,195

[22] Filed: Apr. 28, 1999

Related U.S. Application Data

[60] Provisional application No. 60/083,884, May 1, 1998.

[51] Int. Cl.[7] .................................................. B60K 17/00
[52] U.S. Cl. ...................... 180/377; 180/360; 180/378; 180/383; 180/312
[58] Field of Search ........................... 180/360, 359, 180/378, 377, 354, 353, 352, 344, 383, 385, 348, 312, 292

[56] References Cited

U.S. PATENT DOCUMENTS

| | | | |
|---|---|---|---|
| 2,190,279 | 2/1940 | Zimka et al. ............................ | 180/353 |
| 2,204,989 | 6/1940 | Haltenberger .......................... | 180/352 |
| 3,604,527 | 9/1971 | Price ...................................... | 180/378 |
| 5,036,943 | 8/1991 | Kashiwagi ............................. | 180/312 |
| 5,267,623 | 12/1993 | Kashiwagi ............................. | 180/377 |

*Primary Examiner*—Peter C. English
*Attorney, Agent, or Firm*—Woodard, Emhardt, Naughton, Moriarty & McNett

[57] ABSTRACT

The present invention relates to a race car having a driveline assembled from a transmission and a rear end coupled to one another, wherein the rear end is coupled to the car's frame only through at least one driveline stiffening plate mounted to the frame adjacent to a location at which the transmission is mounted to the frame, whereby flexing between the transmission and the rear end is substantially reduced.

13 Claims, 23 Drawing Sheets

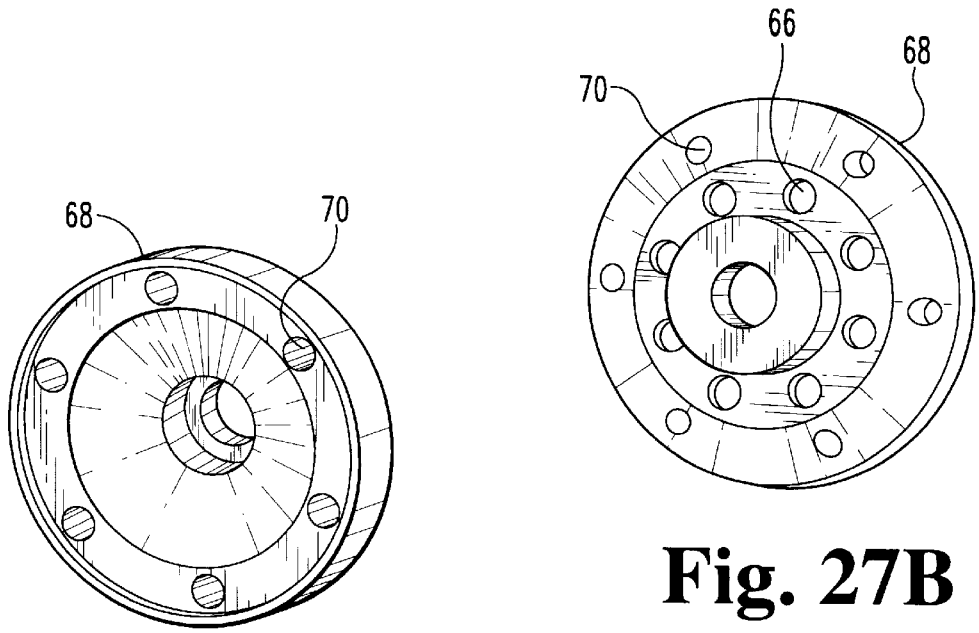
Fig. 27A
Fig. 27B
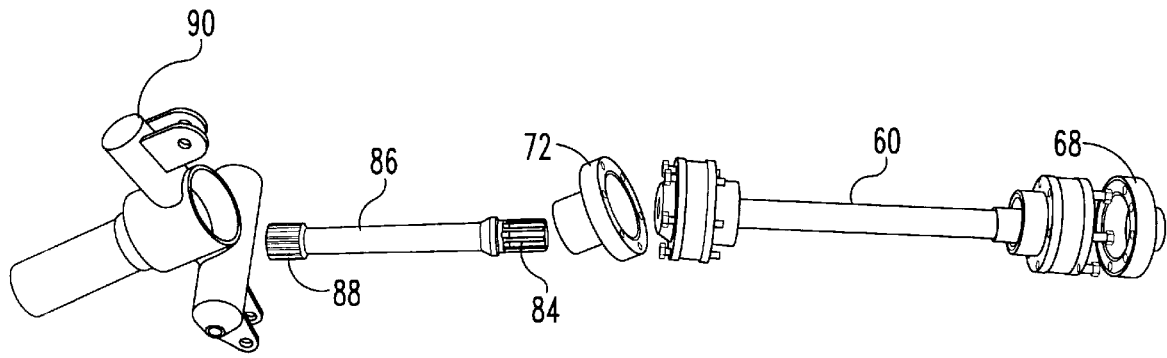
Fig. 28

RACE CAR

This application claims the benefit of U.S. Provisional Application Ser. No. 60/083,884, filed May 1, 1998.

TECHNICAL FIELD OF THE INVENTION

The present application generally relates to automotive vehicles and, more particularly, to a race car.

BACKGROUND OF THE INVENTION

Automobile racing employing open wheeled race cars has enjoyed widespread popularity throughout the world. Currently in the United States, the Indy Racing League (IRL) enjoys a very large audience at each of its super speedway venues. At each of these events, large numbers of fans pay to see high-powered, high-speed open-wheeled race cars compete on an oval track. The cost to the teams competing in these events is quite substantial, usually being measured in the millions of dollars for a single season.

At the grass roots motor sports level, there are several rear-engine open-wheeled race car series which are designed to be attractive to entry-level racers and those at the lower levels of the racing hierarchy. Examples include, Formula Vee, Formula Ford, and Toyota Atlantic race car designs. Such races are normally amateur events, not run for money. Each of these race car platforms are appealing to racers at these levels because of their relatively low cost and the thrill that can be obtained from racing them. Typically, these machines will have top speeds in the 100–120 mph range, depending upon the track that they are raced upon. However, all of these rear-engine open-wheeled race cars are raced on road courses rather than on ovals.

Additionally, prior experience has proven that these racing platforms are not popular with spectators, and consequently, such races are attended by few spectators who do not have some personal relationship with the race car drivers or car owners. In fact, the organizers of these events do not even attempt to sell tickets to spectators. It is believed that much of the reason for lack of fan support for these race series results from the fact that the cars, while superficially resembling the higher echelon race cars such as IRL cars, do not obtain as high a top speed as the IRL cars, are much quieter, are smaller, and have thinner wheels. All of these factors appear to decrease the amount of excitement felt by spectators while watching these cars race.

There do exist a number of oval track venues for racing levels below the IRL level, such as midget cars and sprint cars, and these events do attract large numbers of paying spectators. These are normally professional events run for money. However, these cars are all front-engine cars (rear-engine cars normally being disallowed by the rules) that race predominantly on short dirt tracks and that do not reach very high top speeds (as compared to IRL cars).

There is therefore a need in the racing industry for a rear-engine open-wheeled race car designed for oval track racing that has a low enough cost for race drivers at the lower echelons of the racing hierarchy to afford, but will still obtain very high maximum speeds, create a sound similar to the IRL race cars, and look physically similar to the IRL cars, thereby drawing paying spectators to watch the cars compete. The present invention is directed toward meeting this need.

SUMMARY OF THE INVENTION

The present invention relates to a race car design having a number of novel features. The car is constructed as a tube-frame chassis covered in a stressed steel skin welded thereto, such that the skin becomes a stressed component of the entire car. The car's driveline is assembled using an off-the-shelf transmission and a rear end with custom adaptors to couple the rear end to the transmission and to couple the driveline to the car chassis for rigidity. The prior art rear end is modified from its standard solid rear axle configuration to an independent suspension for each rear wheel through the use of several adaptor components.

In one form of the invention a race car chassis is disclosed, comprising a plurality of tubular elements welded together to form a frame of the race car; and a plurality of steel skin sections welded to the frame wherein the plurality of steel skin sections form a stressed component of the race car.

In another form of the invention, a method for welding a substantially flat sheet of metal to a section of metal tubing is disclosed, comprising the steps of (a) placing the metal sheet such that a first edge of metal sheet rests upon the metal tubing and a remainder of the metal sheet extends beyond the metal tubing; (b) forming a first series of spot welds from a first side of the metal sheet and along the first edge of the metal sheet, thereby joining the metal sheet to the metal tubing; (c) forming a second series of spot welds from a second side of the metal sheet and along an intersection between the second side of the metal sheet and the metal tubing, thereby further joining the metal sheet to the metal tubing, wherein the first and second series of spot welds are interstitially spaced.

In yet another form of the invention, a race car is disclosed, comprising a frame; an engine attached to the frame, the engine having a crankshaft extending therefrom; an engine plate coupled to the frame and having a first hole therethrough for passage of the engine crankshaft; a transmission mounting plate coupled to the engine plate and having a second hole therethrough substantially aligned with the first hole of the engine plate; a transmission mounted to the transmission mounting plate and having a transmission input shaft and a transmission output shaft, wherein the transmission input shaft extends through the second hole and is operatively coupled to the engine crankshaft; an adaptor coupled to the transmission and surrounding the transmission output shaft, the adaptor having an internal cylindrical bearing surface; a rear end mounted to the adaptor and having a rear end input shaft surrounded by the adaptor; a drive coupler coupled to the transmission output shaft and to the rear end input shaft and disposed within the adaptor for rotation within the internal cylindrical bearing surface; and at least one driveline stiffening plate mounted to the transmission mounting plate and to the rear end, whereby flexing between the transmission and the rear end is substantially reduced.

In another form of the invention, a race car is disclosed, comprising a frame; an engine attached to the frame, the engine having a crankshaft extending therefrom; a transmission coupled to the frame at a first location and having a transmission input shaft and a transmission output shaft, wherein the transmission input shaft is operatively coupled to the engine crankshaft; a rear end coupled to the transmission and having a rear end input shaft operatively coupled to the transmission output shaft; and at least one driveline stiffening plate coupled to the frame at a second location adjacent the first location and further coupled to the rear end, whereby flexing between the transmission and the rear end is substantially reduced.

In another form of the invention a rear axle for a race car is disclosed, comprising a rear end having an input shaft; a hollow spool coupled to the rear end and operative to rotate with rotation of the rear end input shaft, the spool having a first spool side and a second spool side thereof; first and second half axles, the first half axle coupled to the first spool side and the second half axle coupled to the second spool side, each of the first and second half axles comprising a rear end adaptor flange having a first rear end flange side coupled to the spool, and a second rear end flange side; a half shaft having a first half shaft side coupled to the second rear end flange side, and a second half shaft side; a hub adaptor flange having a first hub flange side coupled to the second half shaft side, and a second hub flange side; a short shaft having a first short shaft side coupled to the second hub flange side, and a second short shaft side; and a wheel hub coupled to the second short shaft side.

In another form of the invention an independent rear suspension for a race car is disclosed, comprising an upright having a passage therethrough, said passage having a first bearing surface and a second bearing surface; a hub having an internal bearing surface rotatingly engaging the first bearing surface; a short shaft extending through said passage and having a first end coupled to the hub and a second end rotatingly engaging the second bearing surface; and at least one suspension component coupling the upright to a chassis of the race car.

BRIEF DESCRIPTION OF THE DRAWINGS

FIG. 27A is a front perspective view of an adapter flange of the present invention.

FIG. 27B is a rear perspective view of the adapter flange of FIG. 27A.

FIG. 28 is an exploded perspective view of the independent rear suspension of the present invention.

DETAILED DESCRIPTION OF THE PREFERRED EMBODIMENTS

Figure 1:
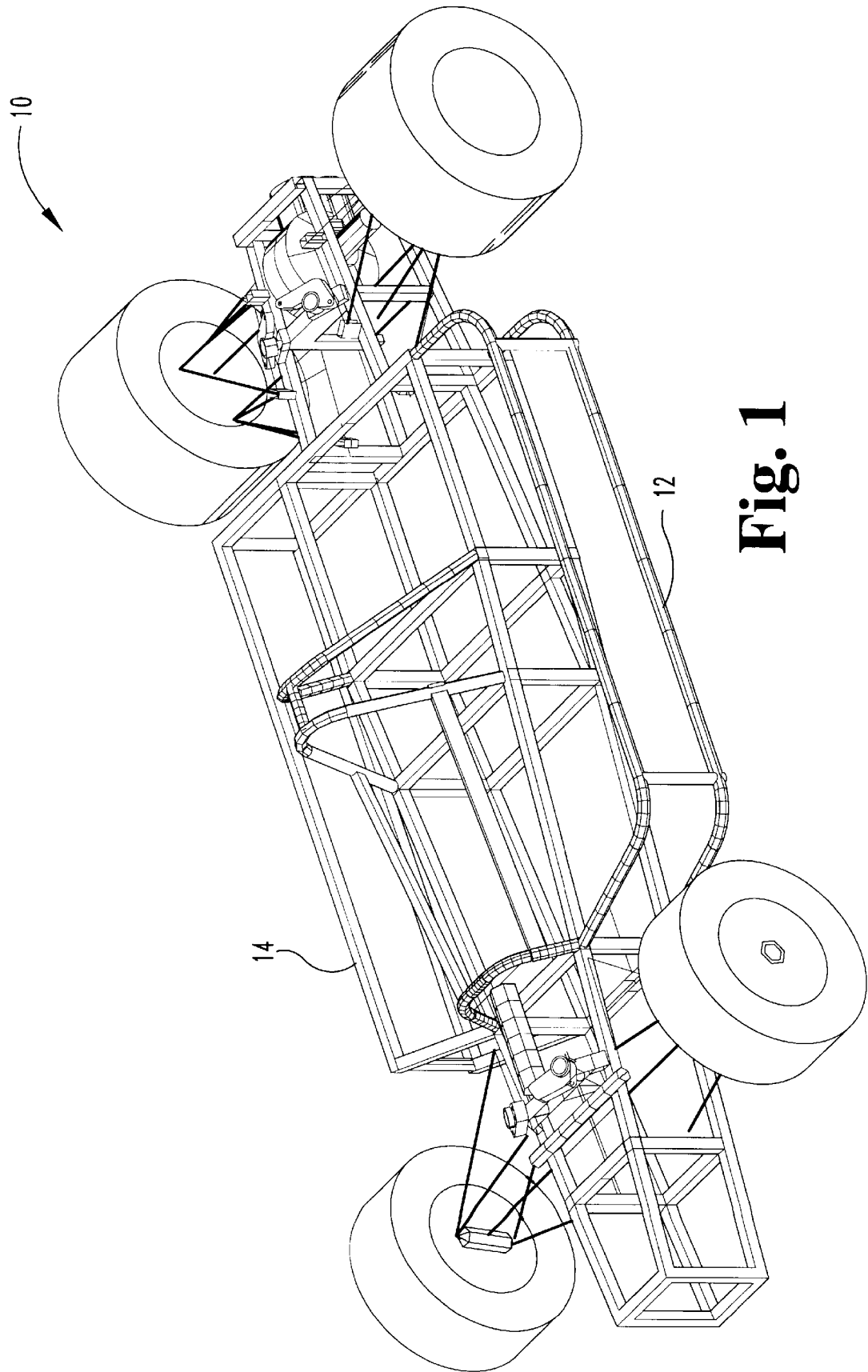
FIG. 1 is a first perspective view of a tubular chassis of a race car of the present invention.
Figure 2:
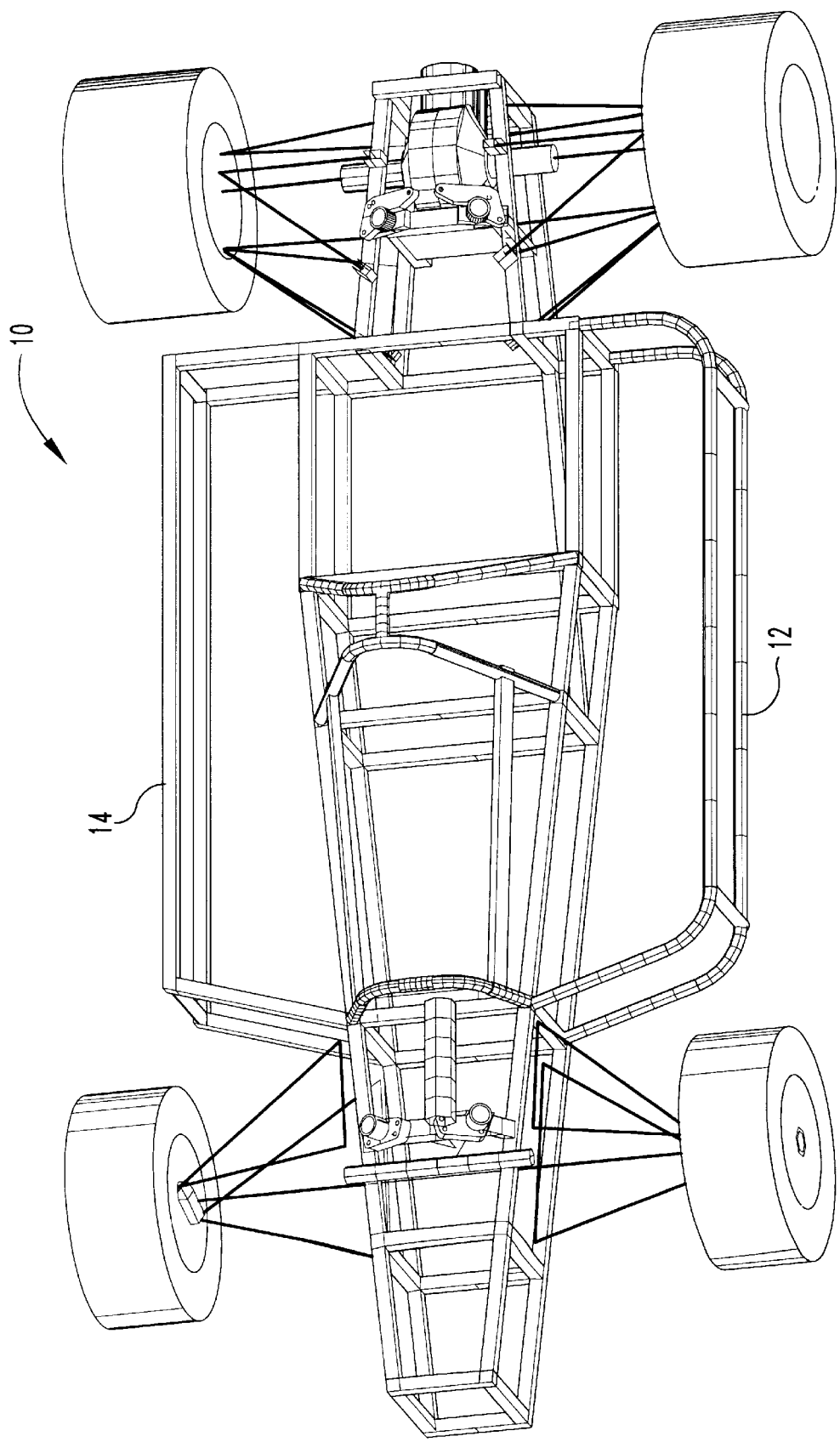
FIG. 2 is a second perspective view of the tubular chassis of the race car of the present invention.
Figure 3:
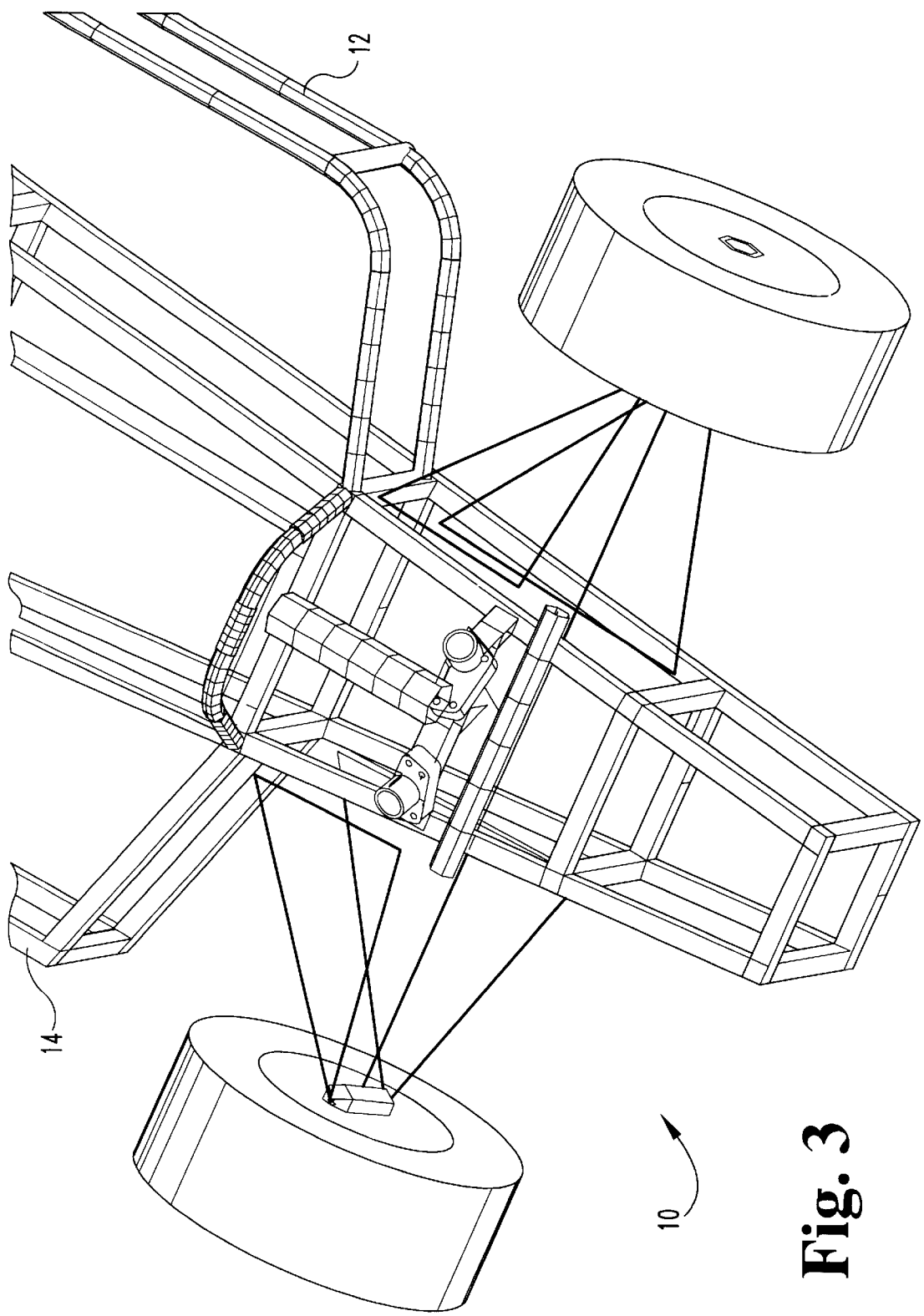
FIG. 3 is a partial perspective view of the tubular chassis of the front end of the race car of the present invention.
Figure 4:
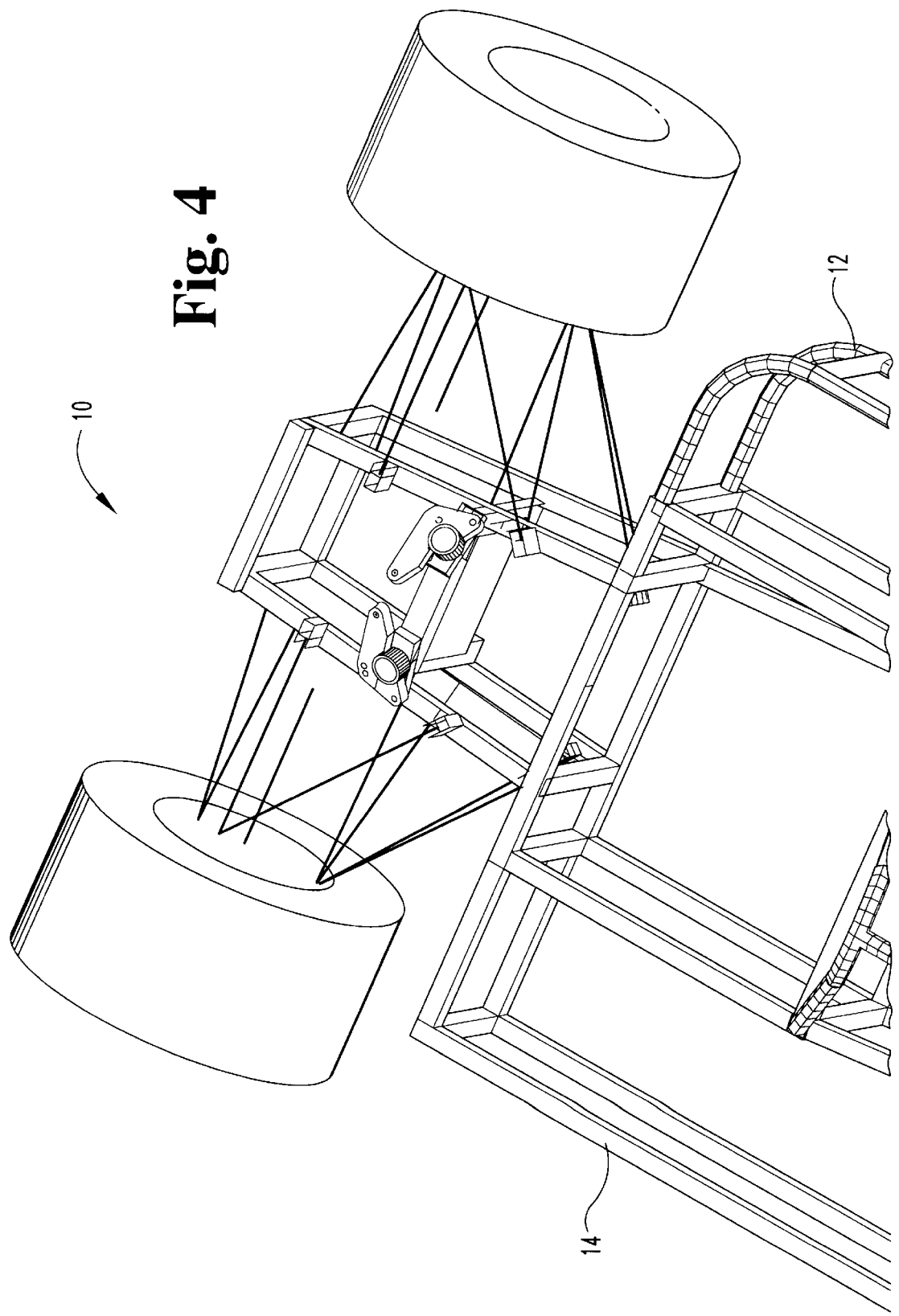
FIG. 4 is a partial perspective view of the tubular chassis of the rear end of the race car of the present invention.
Figure 5:
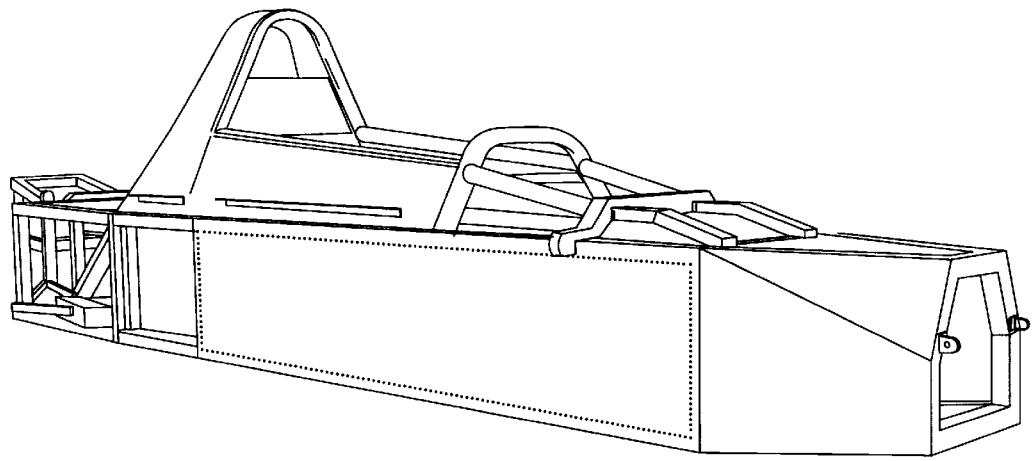
FIGS. 5–8 are perspective views of a tubular chassis of the present invention partially covered with a stressed steel skin.
Figure 6:
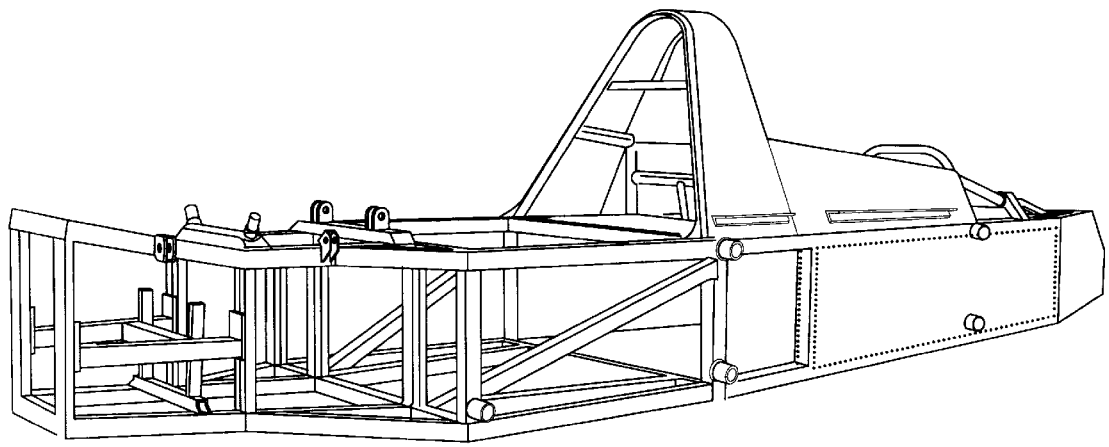
Figure 7:
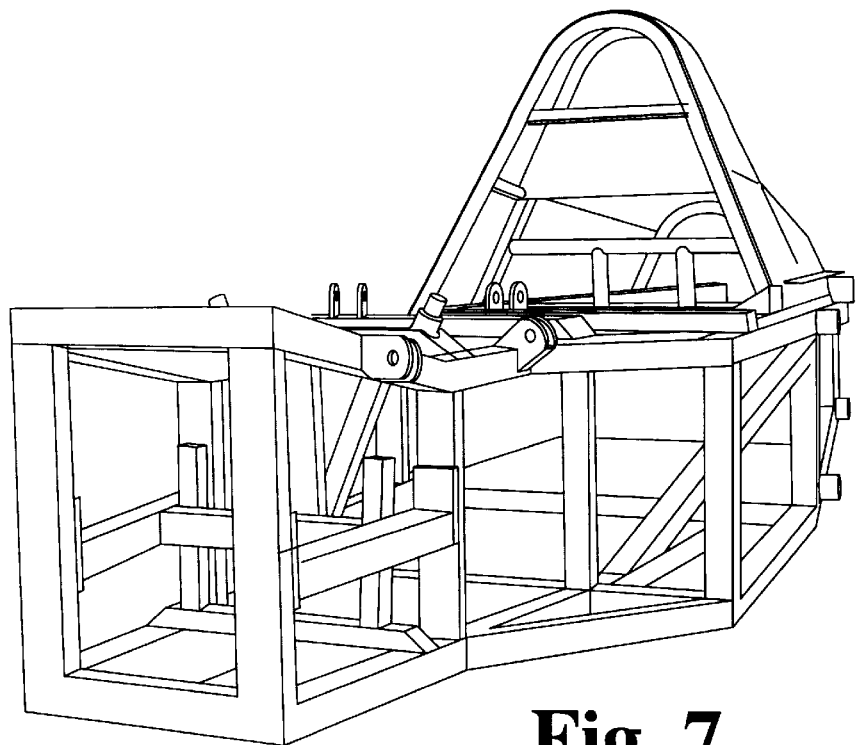
Figure 8:
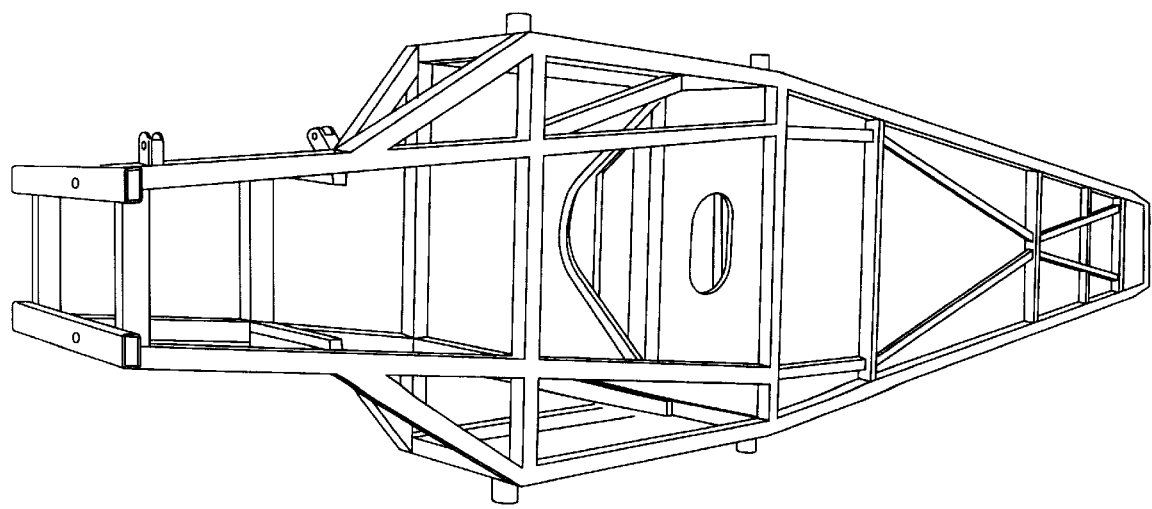
Figure 9:
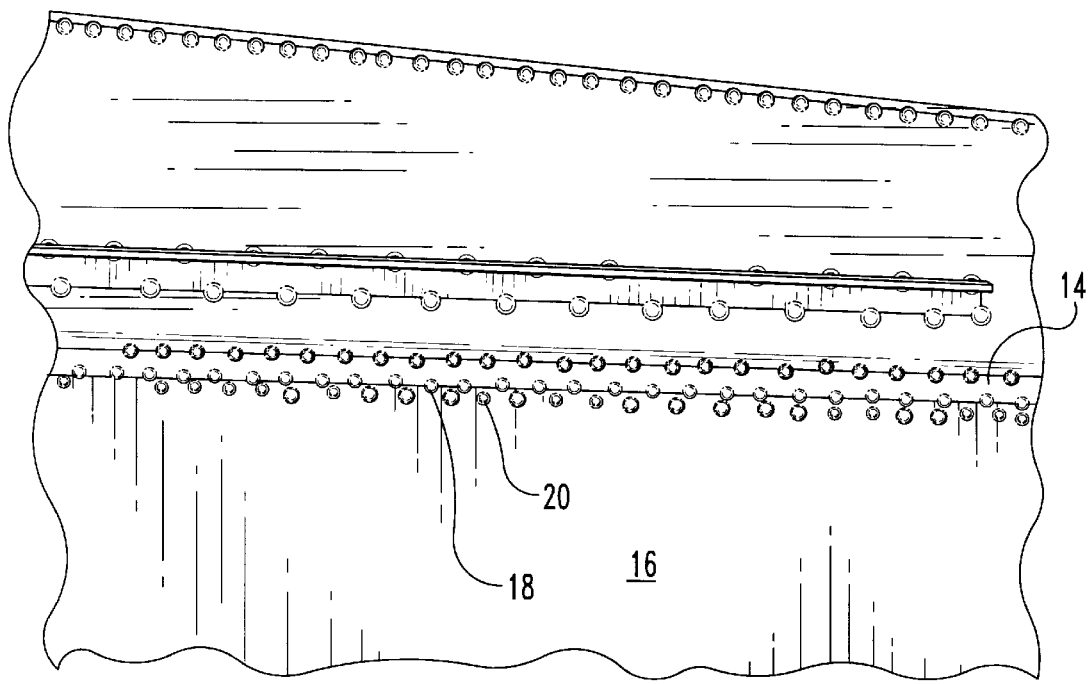
FIGS. 9–12 illustrate a preferred weld configuration for attaching the stressed steel skin to the tubular chassis of the present invention.
Figure 10:
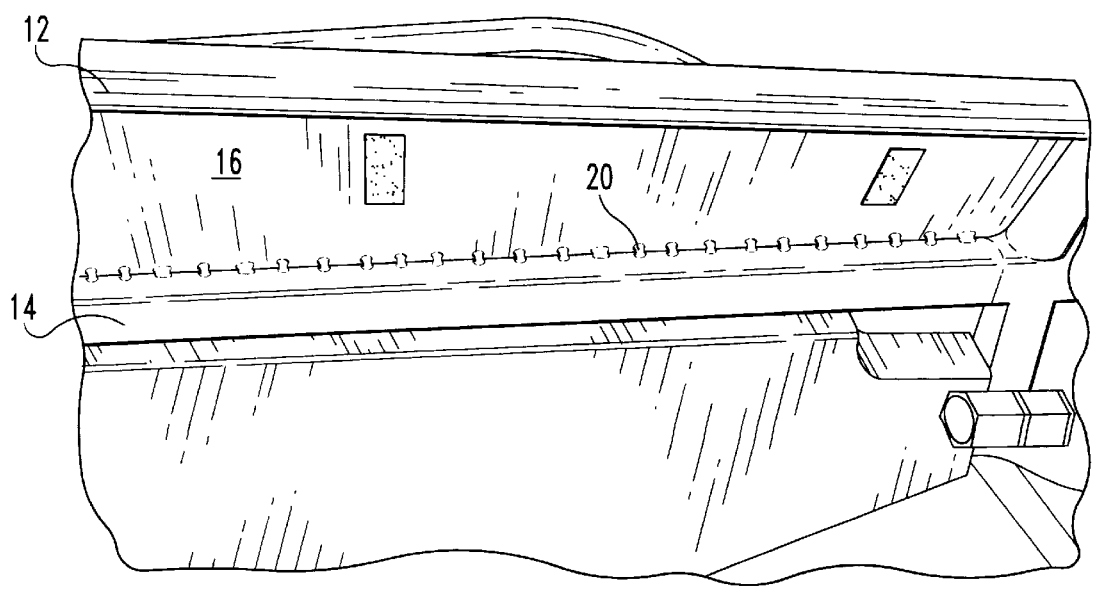
Figure 11:
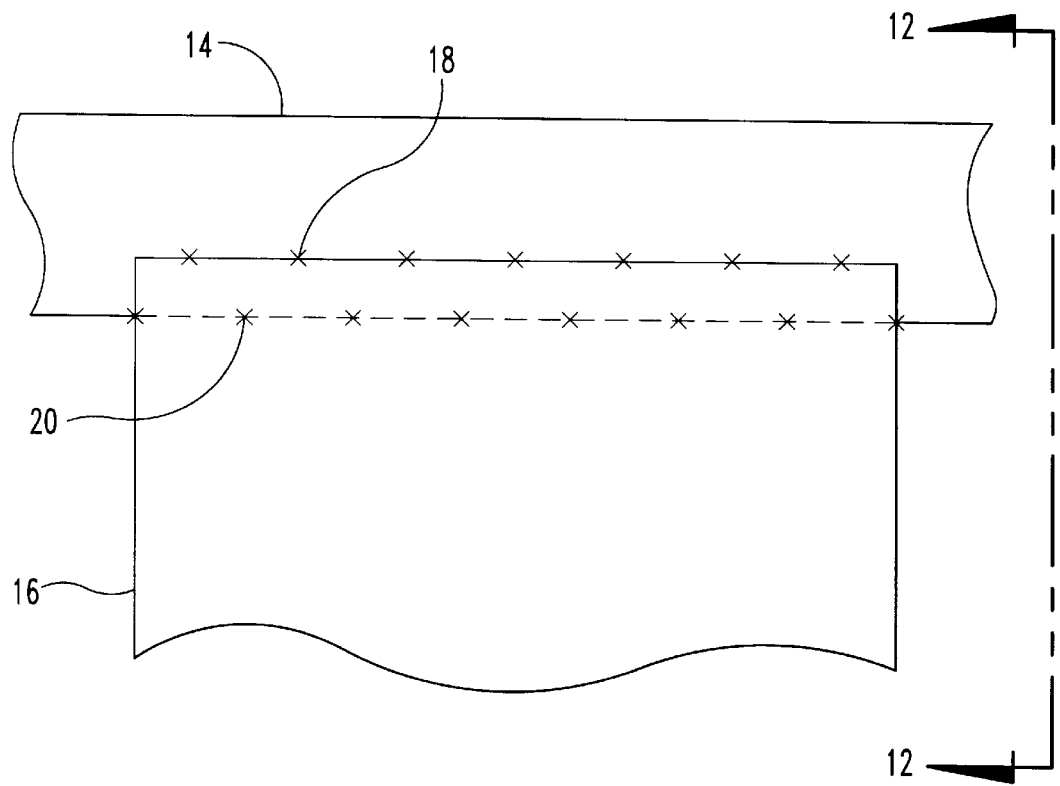
Figure 12:
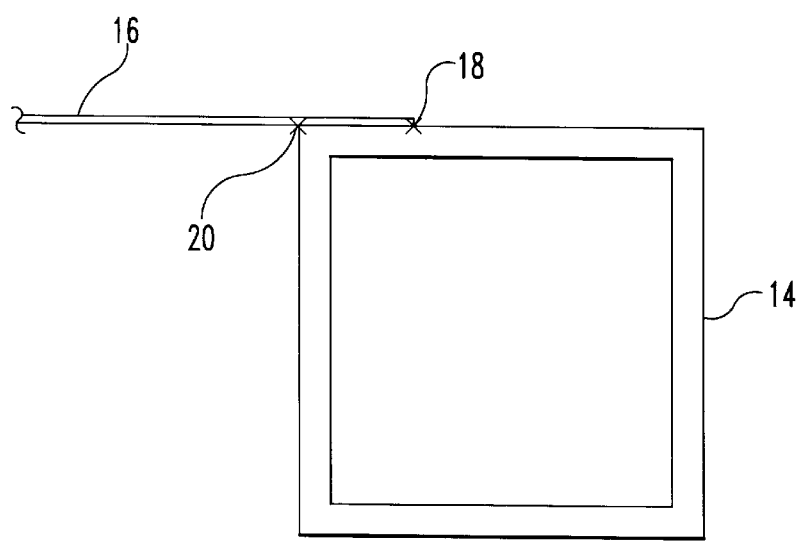

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention comprises a race car that is physically similar to an IRL open-wheeled race car in size, appearance, sound generation, and maximum speed. However, the race car of the present invention is designed to be produced and raced at relatively low cost, such as for $60–$75,000.

Referring to FIGS. 1–4, there is illustrated a perspective view of a race car chassis frame 10 of the present invention with wheels and a rear end mounted therein. These figures show the left side pod of the car being formed from 1010 mild steel round welded-seam tubing 12 (the preferred embodiment), while the right side of the car is shown with a side pod manufactured from an optional mild steel (1010 welded-seam) square tubing 14. An actual race car chassis frame 10 would preferably incorporate left and right side pods of equivalent construction. The remainder of the chassis frame 10 is preferably formed from a combination of the square tube 14 and the round tube 12. The roll cage for the driver is preferably 1½"×0.120" wall DOM 1026 round steel tubing. The exact configuration of the assembly of tubing sections to form the chassis 10 does not comprise an important aspect of the present invention. A multitude of such chassis configurations are known in the art.

After the tube-frame chassis has been welded together, it is covered in a stressed steel skin, such as 0.0048" 1010/1015 cold-rolled steel that has been pickled in oil, in order to form a semi-monocoque tub. FIGS. 5–8 illustrate a chassis partially covered with such steel skins. By using such steel skins, the steel skin becomes a stressed component of the entire car, adding to its strength, rigidity, and safety. This material results in a chassis that weighs more than a race car built using conventional techniques; however, there is a trade-off in less expensive material, in ease of construction and in increased rigidity of the car due to the stressed skin material.

The skin is welded to the tube-frame chassis 10 using MIG spot welds. Referring to FIGS. 9–12, the skin 16 is preferably overlapped ½" onto the square tubing member 14. The skin 16 is then preferably welded to the tube 14 on both sides of the skin 16, with approximately 1" separation between welds on the same side of the skin 16. The welds on one side of the skin 16 are then alternated with the welds on the other side of the skin 16, resulting in a ½" separation between adjacent welds. As illustrated in FIGS. 9–12, the welds 18 on the exterior surface of the skin 16 are formed at 1" intervals, while the welds 20 on the interior surface of the skin 16 are also formed at 1" intervals, although the placement of the welds 20 lies between the placement of the welds 18. This interstitially spaced pattern produces an extremely secure contact between the skin 16 and the tubing 14, allowing the skin 16 to become a stressed component of the race car body.

Figure 13:
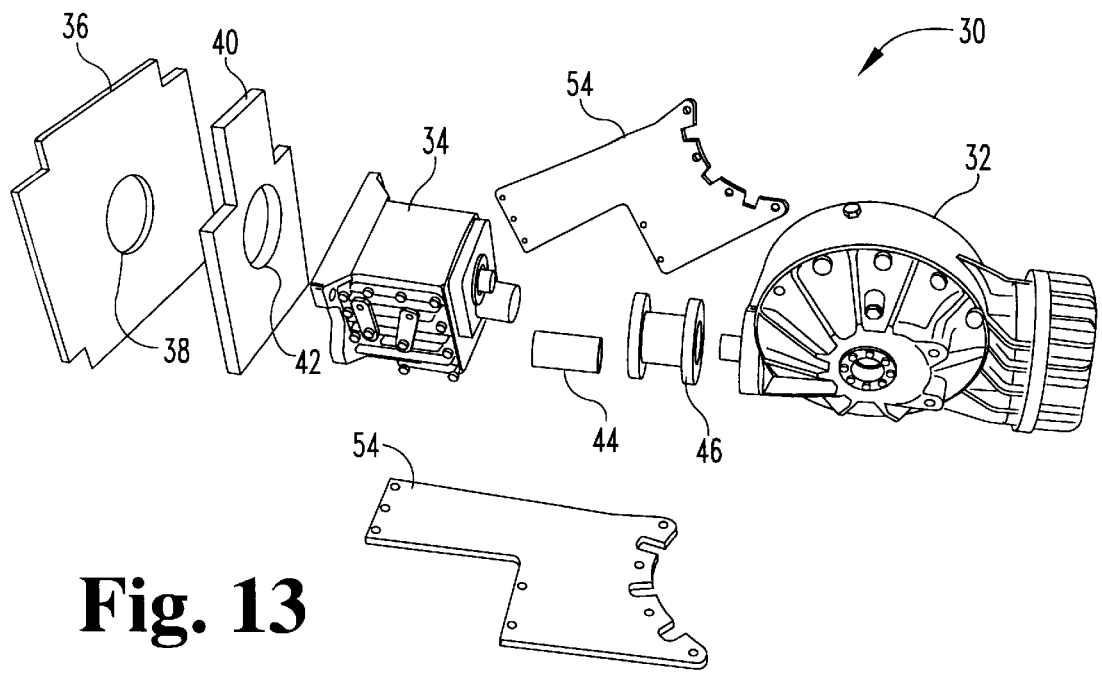
FIG. 13 is an exploded perspective view of a preferred embodiment driveline of the present invention.
Figure 14:
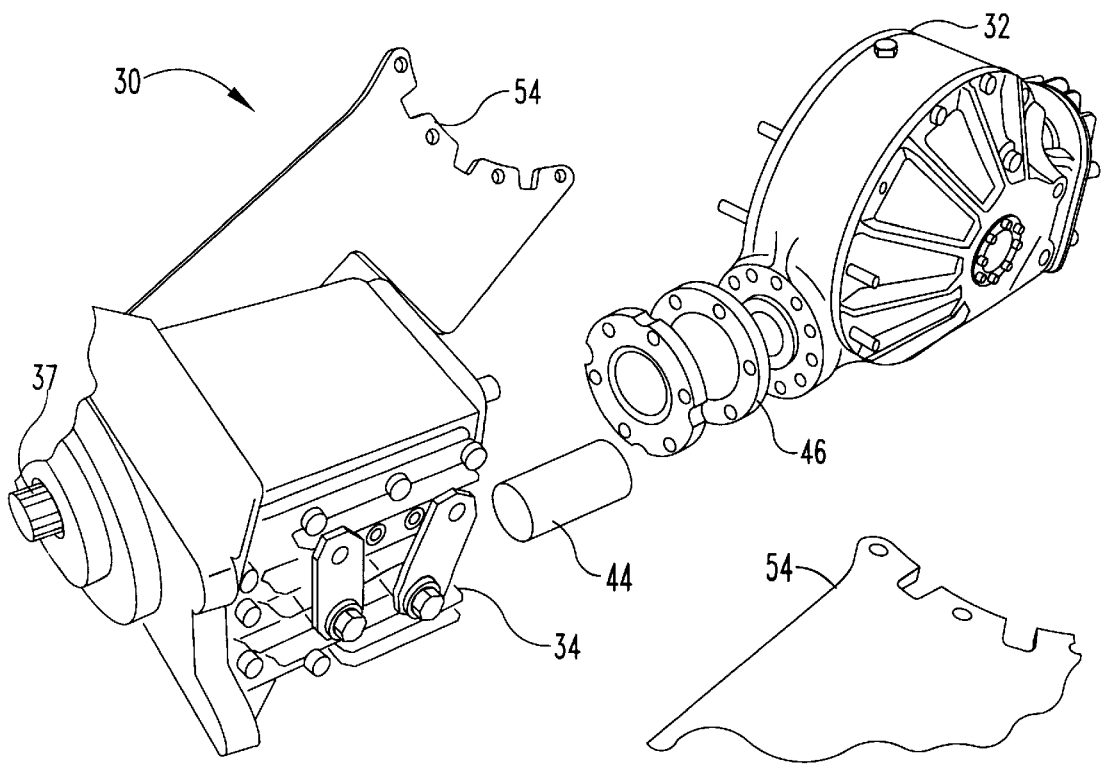
FIG. 14 is a first partial perspective exploded view of the driveline of FIG. 13.

Another method for reducing the cost and increasing the performance capabilities of the race car of the present invention involves the use of standard, off-the-shelf components wherever possible, with modifications being made to these components where necessary for the purposes of the present race car. For example, FIGS. 13 and 14 illustrate the driveline 30 of the race car of the present invention disassembled in an exploded view. The driveline 30 comprises a standard quick-change rear end 32 from a sprint car, which is available as an off-the-shelf component from various suppliers such as Higman, Franklin, etc. The driveline 30 further includes a standard off-the-shelf transmission 34, such as a standard stock car transmission available from Brinn. The Brinn transmission has low, high, and reverse gears; however, it is comprehended by the present invention that the transmission 34 could have any number of forward and reverse gears. FIGS. 21–24 hereinbelow illustrate the driveline 30 installed into the race car of the present invention.

Figure 15:
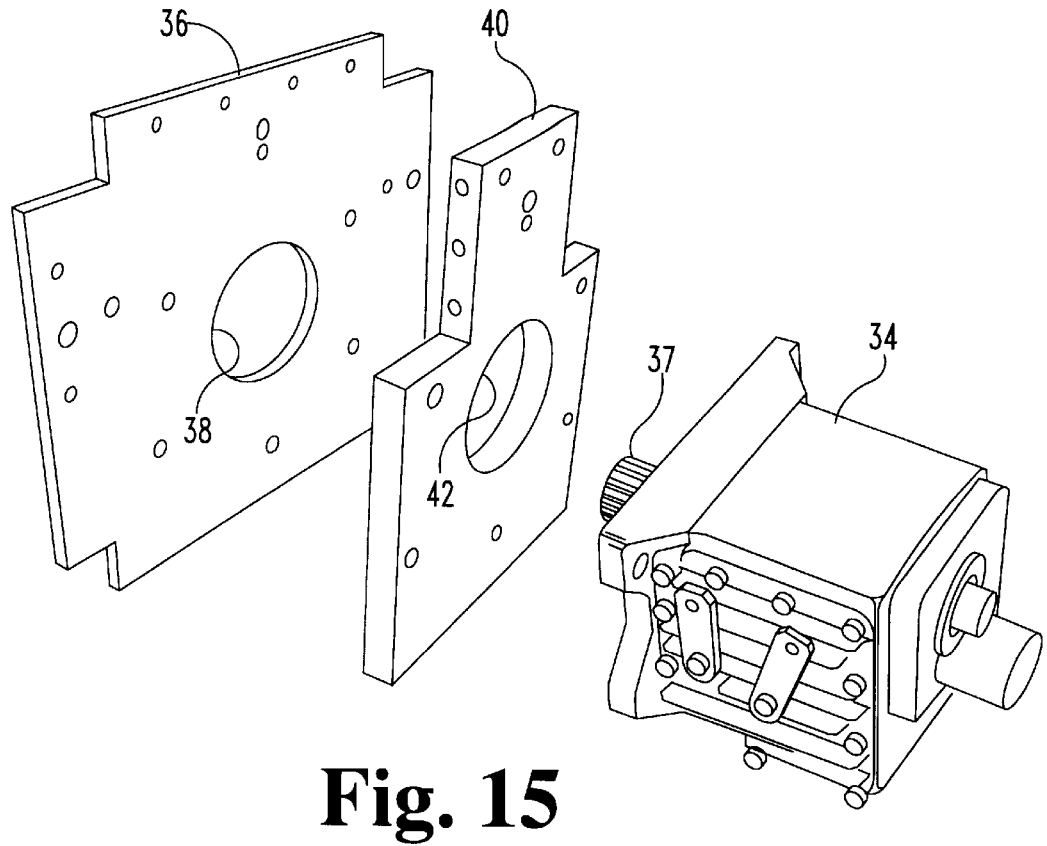
FIG. 15 is a second partial perspective exploded view of the driveline of FIG. 13.

Referring again to FIG. 13, the driveline 30 further comprises a custom machined aluminum engine plate 36 which bolts to the frame of the race car between the engine and the transmission 34, as illustrated in FIGS. 21–24. The engine plate 36 includes a center hole 38 for passage of the engine crankshaft (not shown) therethrough. A custom machined aluminum transmission mounting plate 40 bolts to the engine plate 36 and also includes a central hole 42 therethrough to allow coupling of the engine crankshaft to the input shaft 37 of the transmission 34, which is most clearly visible in the view of FIG. 15.

The transmission 34 bolts directly to the transmission plate 40, thereby securely coupling the transmission 34 to the race car frame. The configuration of the transmission 34, engine plate 36, and transmission plate 40 are better illustrated in the view of FIG. 15.

The output shaft of the transmission 34 comprises a 1⅜" male 10-spline driveshaft. The input shaft of the rear end 32 comprises a 1¼" male 10-spline driveshaft. It is desired that the rear end 32 be coupled to the transmission 34; however, a custom drive coupler is required because of the different shaft configurations between the transmission 34 and the rear end 32. A preferred embodiment of the present invention therefore comprehends the use of a custom machined steel drive coupler 44 which is journalled within a custom machined 6061 aluminum transmission/rear end adapter 46, although those having ordinary skill in the art will recognize that other materials may be used.

Figure 17:
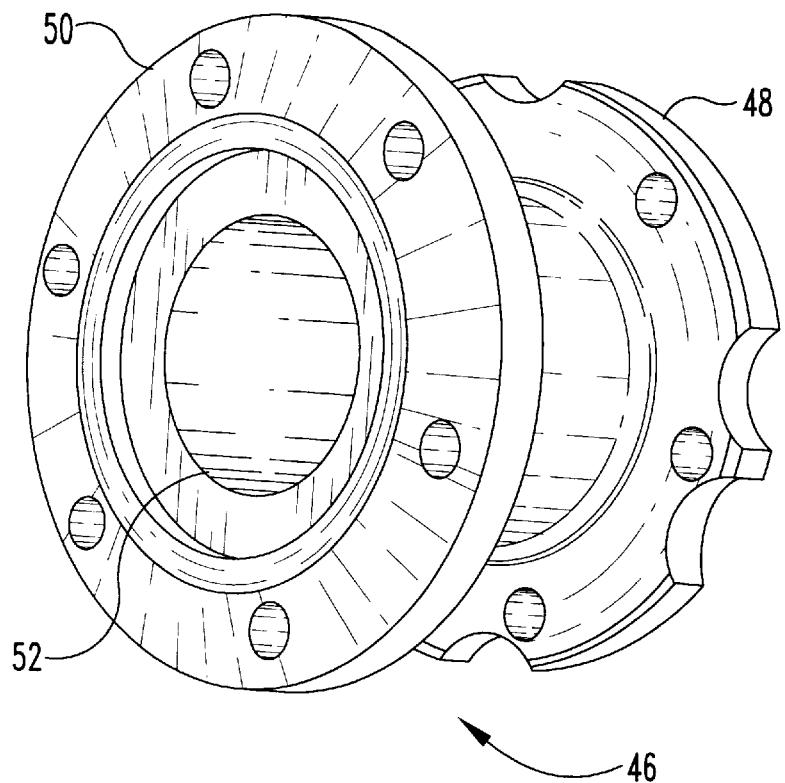
FIG. 17 is a perspective view of a transmission/rear end adapter of the present invention.
Figure 18:
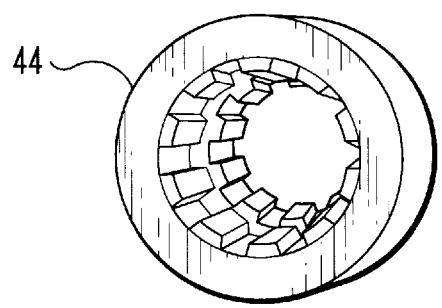
FIG. 18 is a perspective view of a drive coupler of the present invention.
Figure 19:
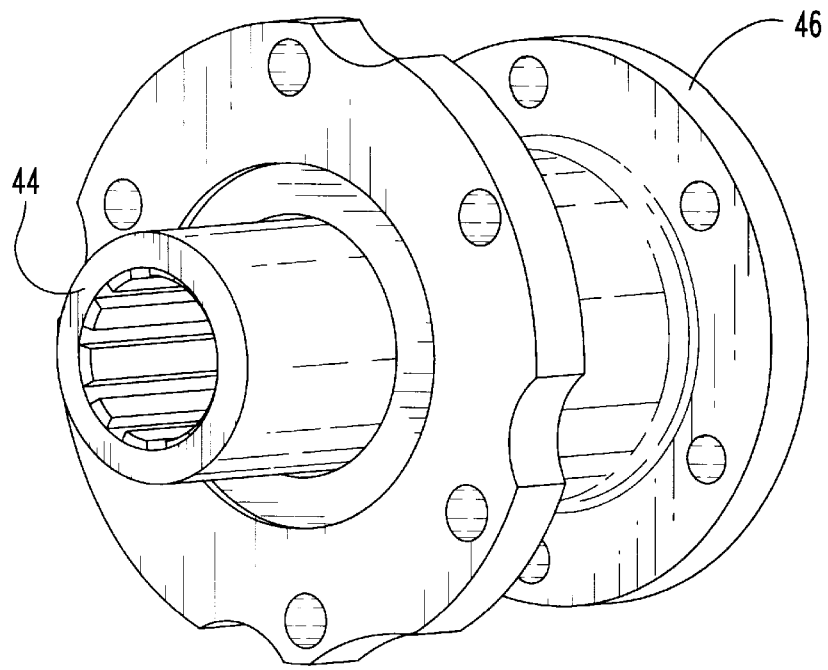
FIG. 19 is a perspective view of the drive coupler of FIG. 18 partially inserted into the transmission/rear end adapter of FIG. 17.
Figure 20:
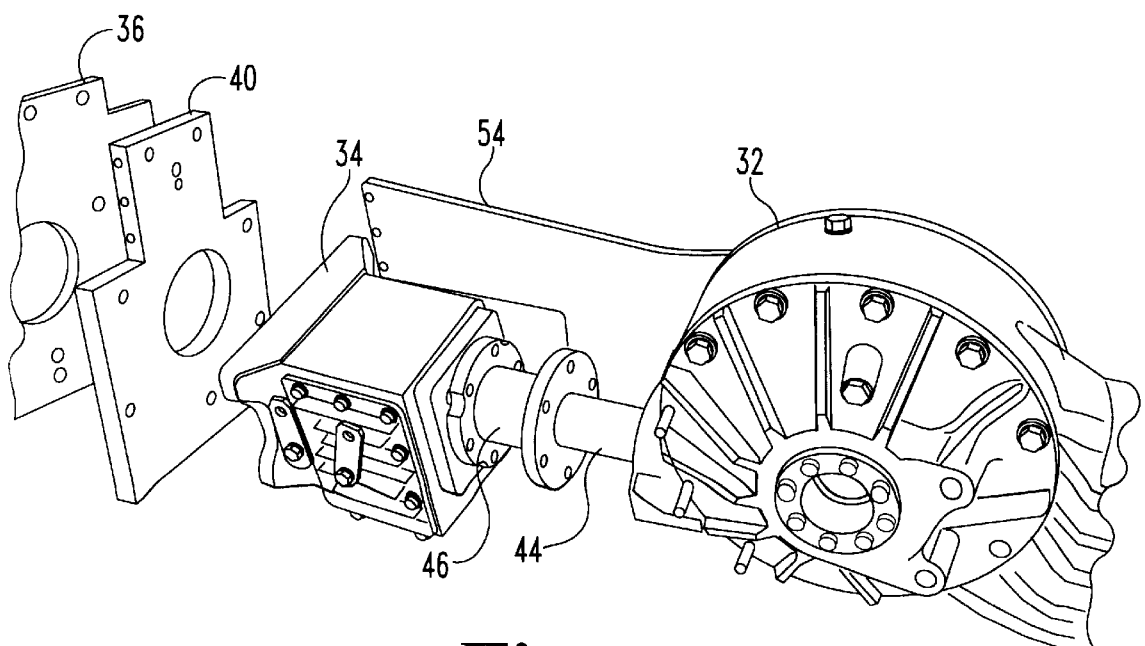
FIG. 20 is a partial exploded perspective view of a preferred embodiment driveline of the present invention.
Figure 21:
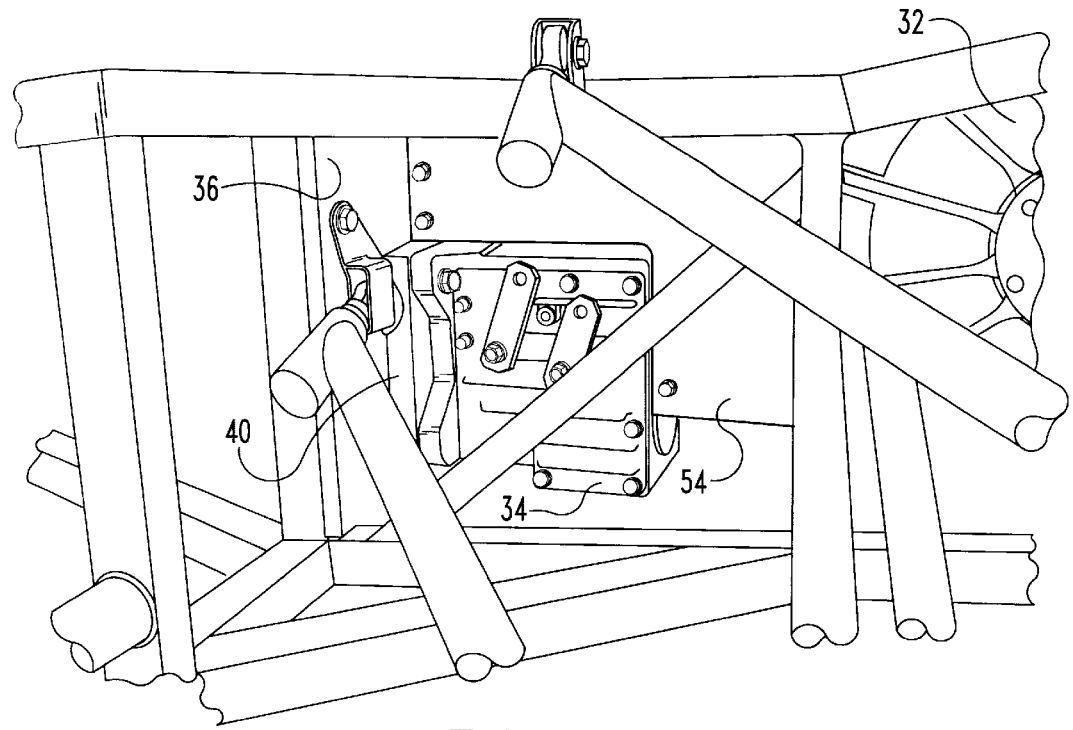
FIGS. 21–24 are perspective views of the preferred embodiment driveline of the present invention mounted to the preferred embodiment tubular chassis of the present invention.
Figure 22:
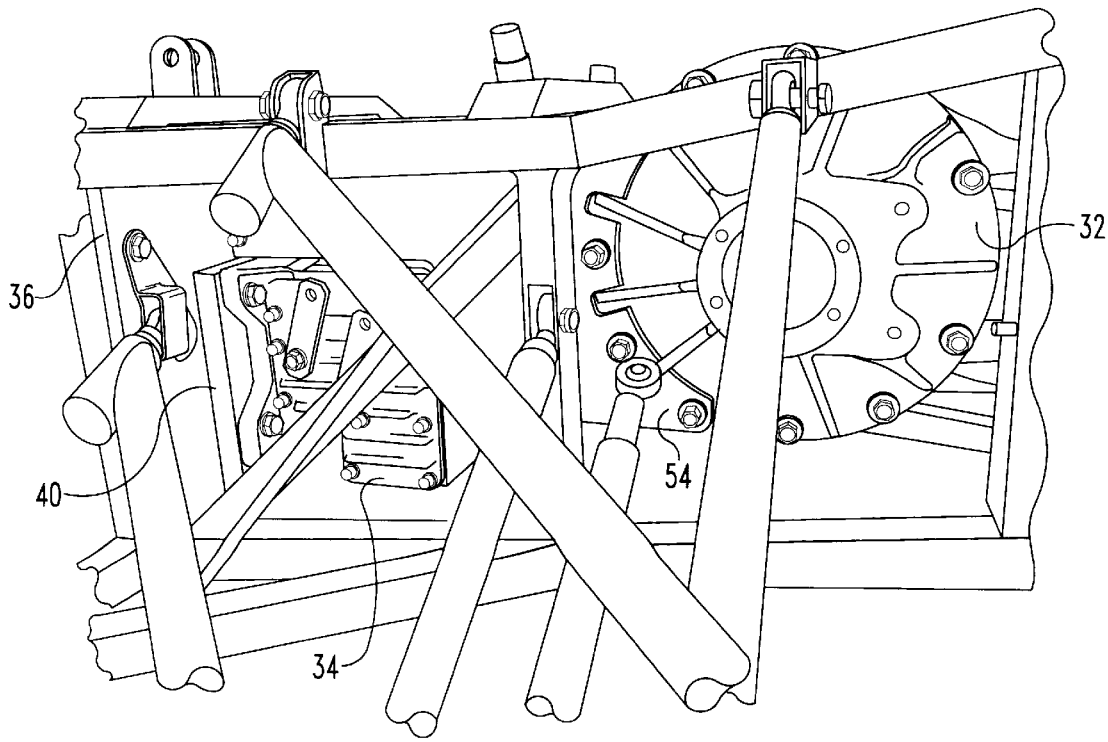
Figure 23:
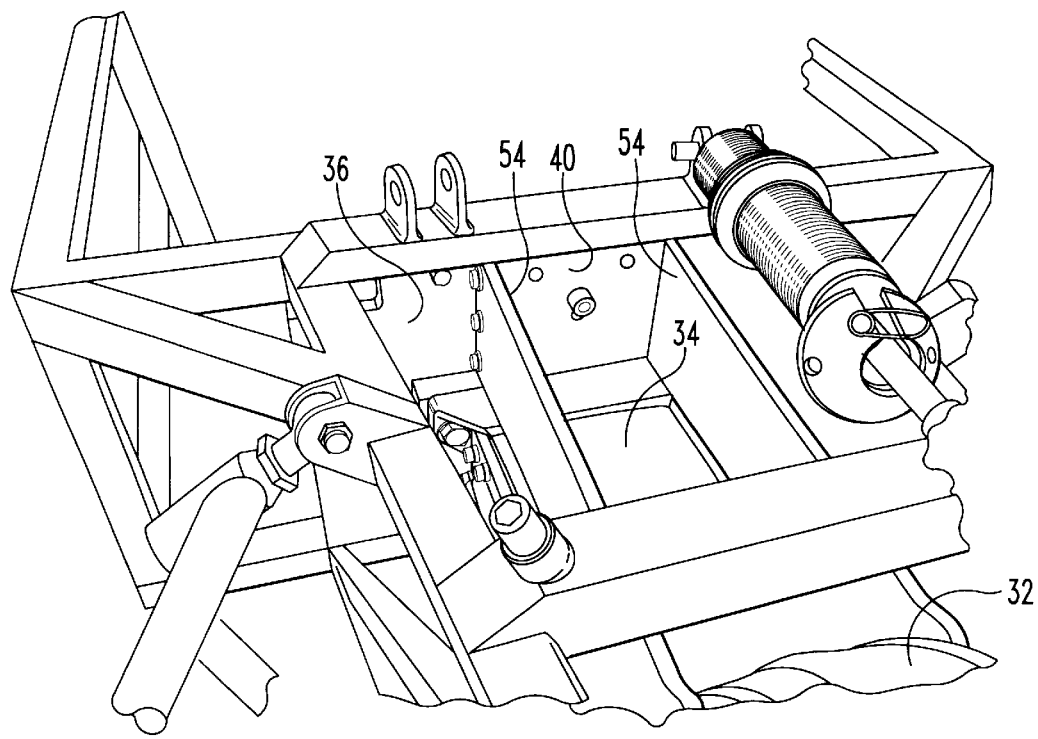
Figure 24:
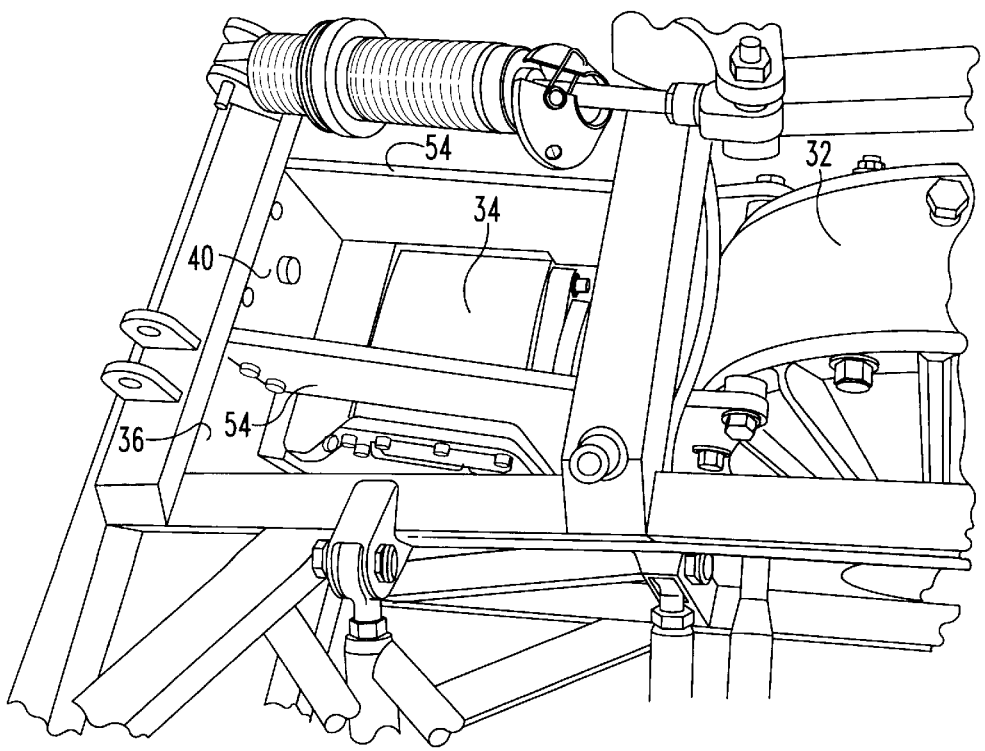

Referring to FIG. 17, the transmission/rear end adapter 46 is preferably a cylindrical member and contains a transmission mounting flange 48 on one end thereof, and a rear end mounting flange 50 on the opposite end thereof. Appropriate mounting holes are formed within the flanges 48 and 50 in order to allow the transmission/rear end adapter 46 to be mounted directly to the transmission 34 and to the rear end 32. As can be seen in the view of FIG. 17, the transmission/rear end adapter 46 includes a central cylindrical passage (internal bearing surface) 52 adapted to receive the drive coupler 44 therein. As illustrated in FIG. 18, the drive coupler 44 is preferably a cylindrical member and has an internal, female 10-spline surface; however, it is machined such that one half of this internal passage is 1⅜" in diameter (for mounting to the transmission 34 output shaft), while the other end of this internal passage is 1¼" (for mounting to the input shaft of the rear end 32). FIG. 19 illustrates the drive coupler 44 partially inserted into the internal bearing surface 52 of the transmission/rear end adapter 46. FIG. 20 shows the transmission/rear end adapter 46 coupled directly to the transmission 34, while the rear end 32 is being moved into position for coupling to the adapter 46.

From the above description, it can therefore be seen that the transmission 34 mounts to the frame of the race car, and the rear end 32 mounts to the transmission 34 through the adapter 46. In this configuration, the rear end 32 is simply hanging off of the rear end of the transmission 34. This arrangement creates too much flex in the drivetrain as the rear end 32 bobs around due to bumps in the race course and to the vibration produced by the race car engine. Some means are needed to stabilize the position of the rear end 32; however, the rear end 32 cannot simply be mounted to the rear frame of the race car because the frame flexes too much to maintain perfect alignment of the rotating drivetrain.

Figure 16:
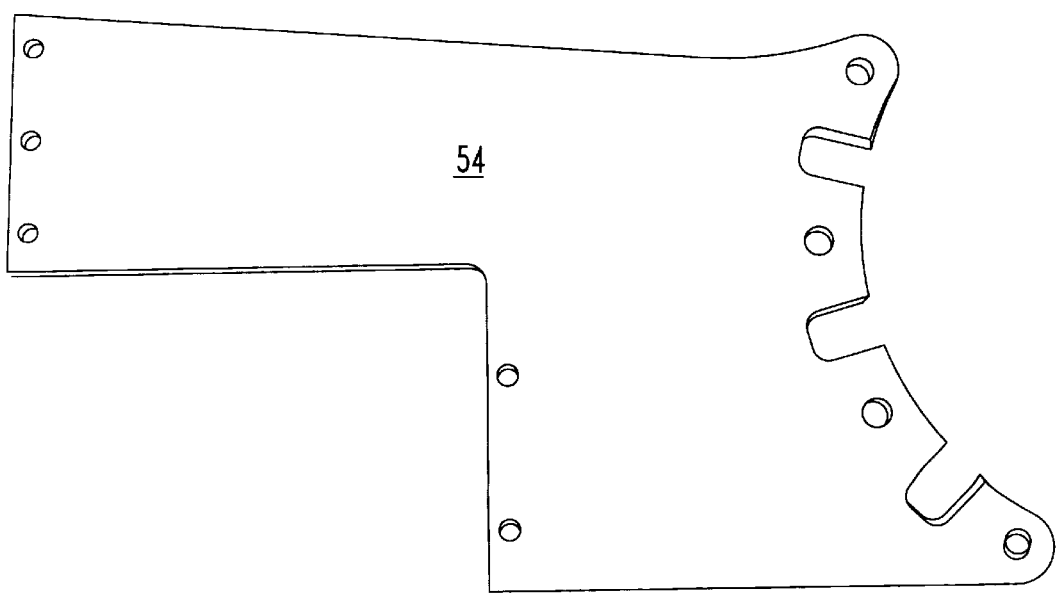
FIG. 16 is a side elevational view of a driveline stiffening plate of the present invention.

The preferred embodiment solution to this problem is a pair of custom machined ⅜" aluminum driveline stiffening plates 54 (see FIGS. 13 and 16) which bolt at one end to the rear end 32 and at their other end to the transmission mounting plate 40. Aluminum is a preferred material for the plates 54 due to its relatively light weight, however any material having acceptable strength may be used, such as steel or other alloys. The driveline stiffening plates 54 extend to either side of the transmission 34 and bolt to the side of transmission 34 as well. The driveline stiffening plates 54 therefore cause the rear end 32 to be mounted to the race car at the same point (transmission plate 40) as the transmission 34, thereby causing these two components to move as a unit and to maintain perfect alignment of the drivetrain. FIGS. 21–24 show the assembled drivetrain affixed to the race car.

Figure 25:
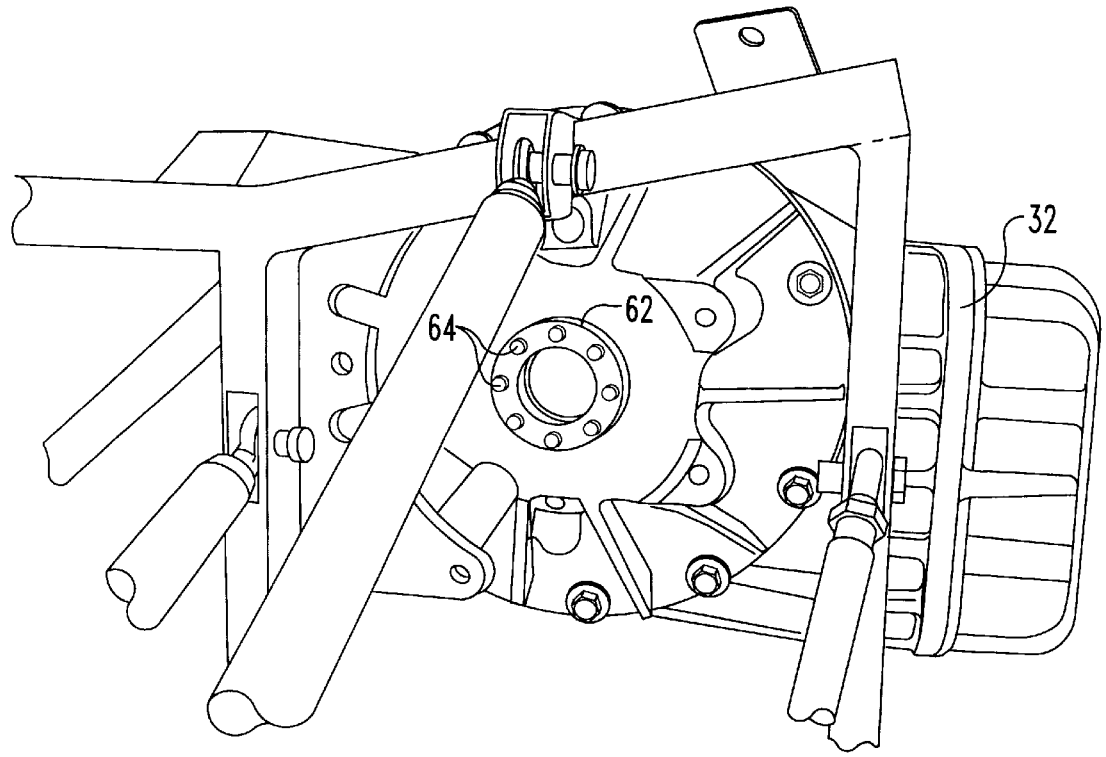
FIG. 25 is an end elevational view of a spool of the present invention mounted in a prior art rear end.
Figure 26:
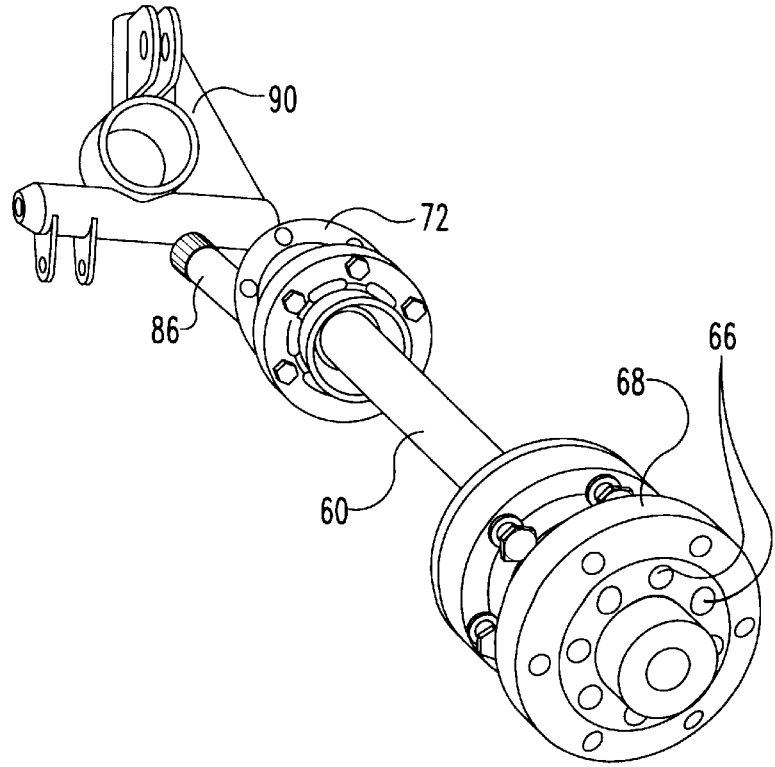
FIG. 26 is a partial exploded view of an independent rear suspension of the race car of the present invention.

In its off-the-shelf (prior art) configuration, the rear end 32 has a solid rear axle running through it which extends to either side of the rear end 32 in order to drive the rear wheels of the vehicle (normally a sprint car). In the present invention, this solid rear axle is preferably removed from the rear end 32 so that a standard half shaft 60 (such as a GKN half shaft) may be coupled to either side of the rear end 32 in order to facilitate provision of an independent suspension for each of the rear wheels. In order to facilitate coupling of the half shaft 60 to the rear end 32, the space within the rear end 32 formerly occupied by the solid axle is replaced with a hollow aluminum spool 62 (see FIG. 25) which is operative to rotate with rotation of the input shaft of the rear end 32. The spool 62 has a series of circumferential pins 64 protruding from either side thereof. These pins engage complementary holes 66 formed into one side of a custom rear end/half shaft adapter flange 68 (see FIG. 26) which is preferably machined from steel. Interaction between the pins 64 and the holes 66 cause the adaptor flange 68 to rotate with the spool 62. The rear end/half shaft adapter flange 68 further includes a series of circumferential holes 70 formed therethrough which allow the adapter flange 68 to be bolted to one end of the half shaft 60. Both sides of the adapter flange 68 are illustrated in FIGS. 27A–B, the side which couples to the rear end 32 being illustrated on the right, while the side which couples to the half shaft 60 is illustrated on the left. Those having ordinary skill in the art will recognize that the adaptor flange 68 and the spool 62 may be formed from any material having the required strength.

Figure 35:
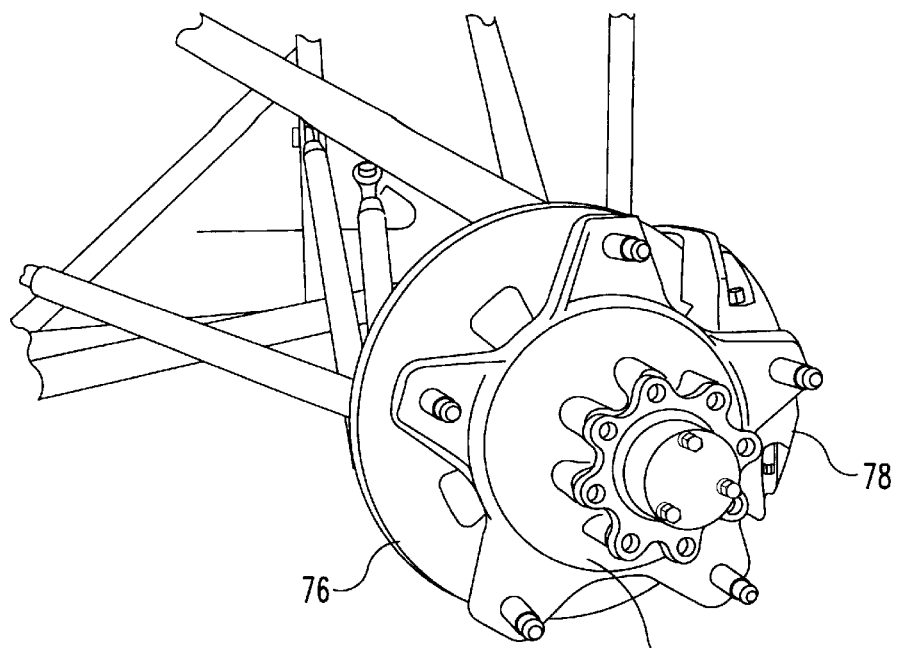
FIG. 35 is a perspective view of a hub and braking system coupled to the tubular chassis of the present invention.
Figure 36:
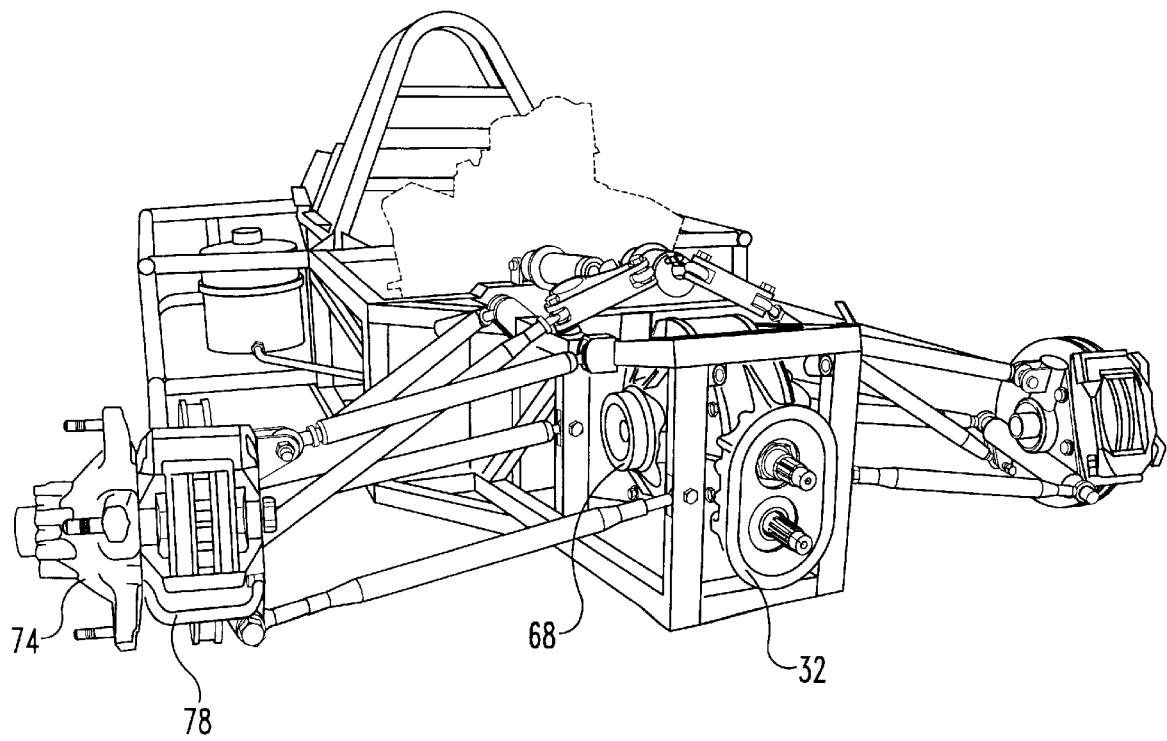
FIGS. 36–39 are perspective views of the rear end and driveline of the present invention mounted to the tubular chassis of the present invention.
Figure 37:
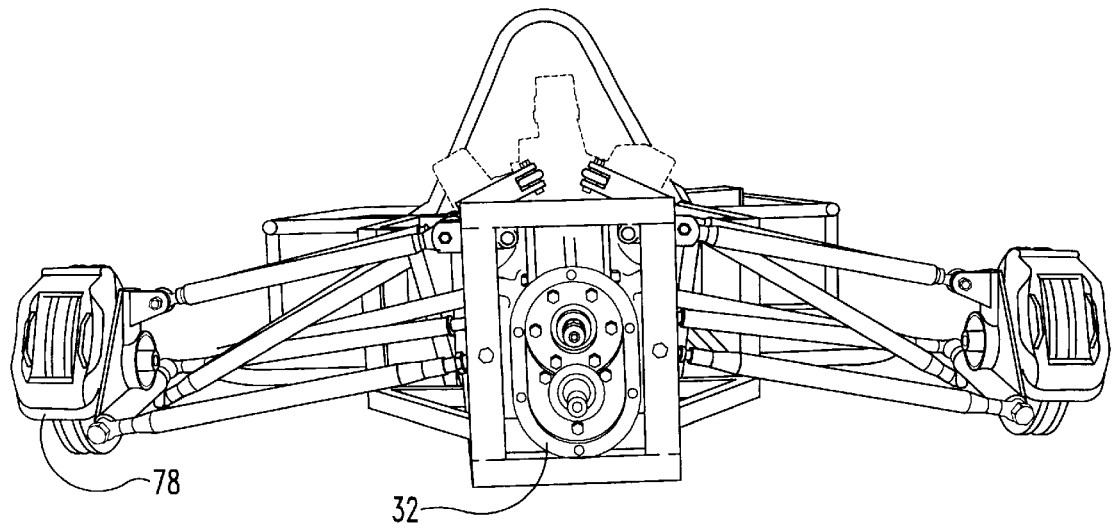
Figure 38:
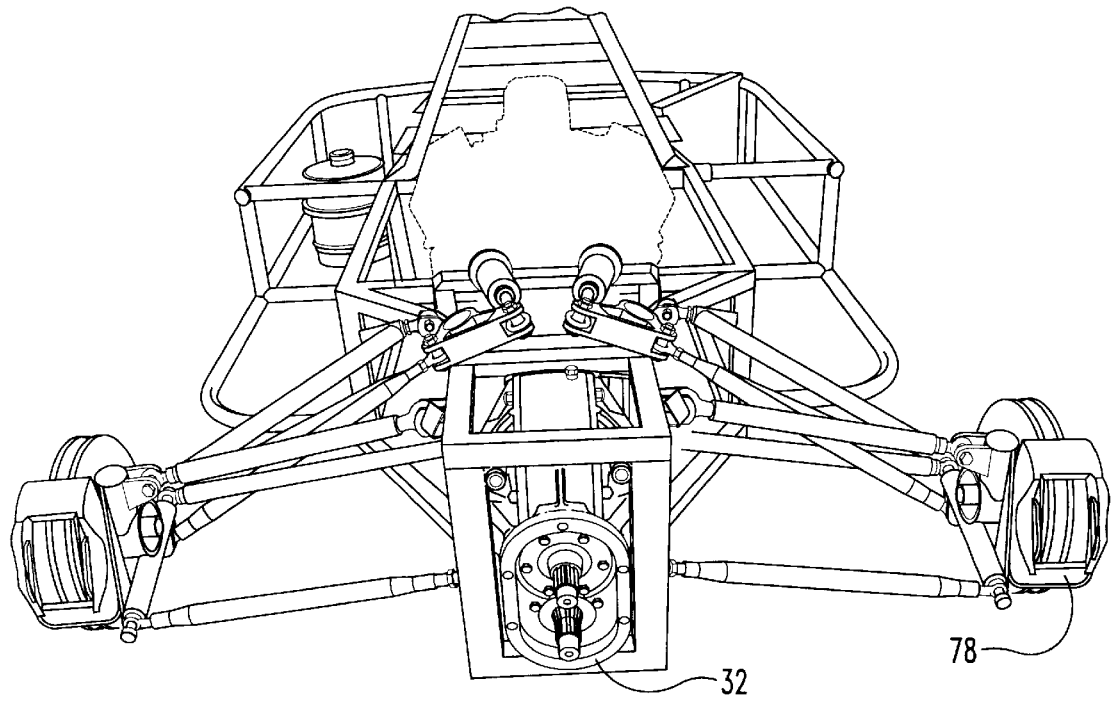
Figure 39:
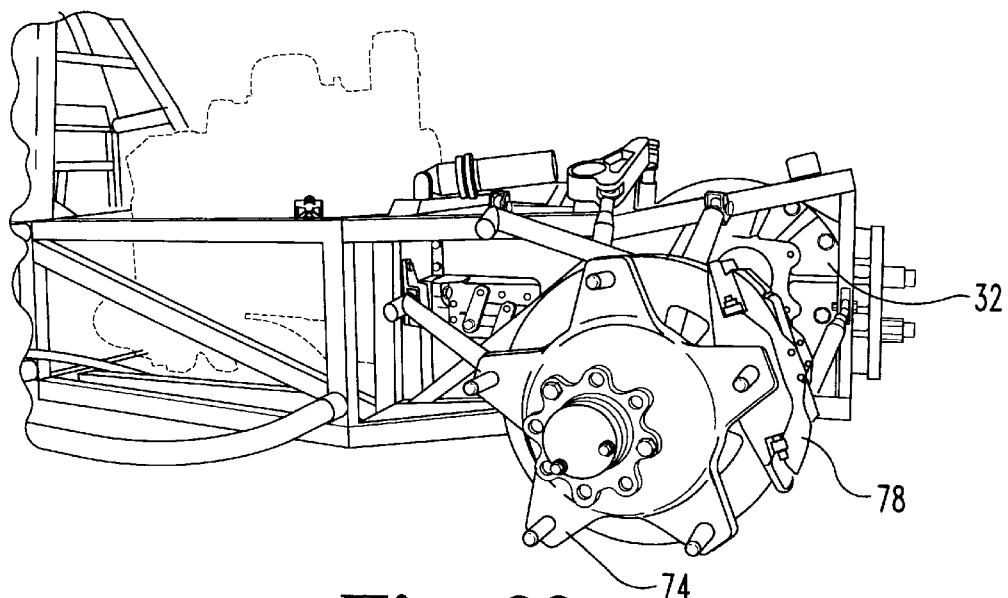
Figure 40:
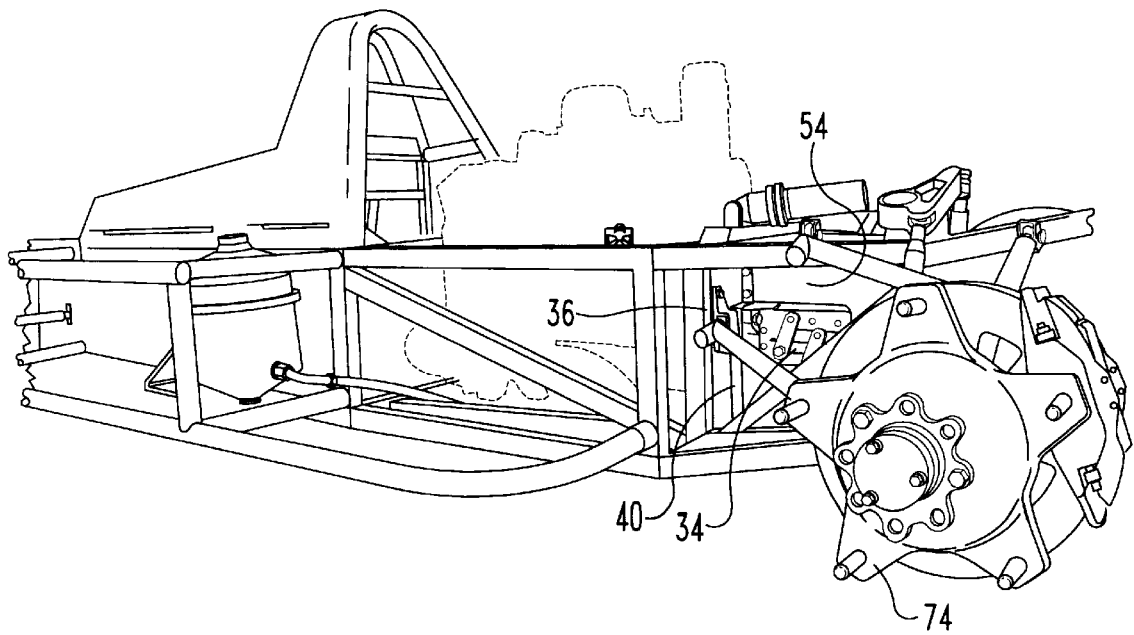
FIG. 40 is a perspective view of a portion of the driveline of the present invention mounted to the tubular chassis of the present invention.

The other end of the half shaft 60 (the end nearest to the rear wheel) is bolted to a half shaft/hub adapter flange 72 (see FIG. 28) which facilitates coupling of the half shaft 60 to the hub of the rear wheel. As shown in FIG. 35, the present invention preferably utilizes an off-the-shelf hub 74 available from Wilwood. The hub 74 has a brake disc 76 and brake calipers 78 mounted thereto.

Figure 29A:
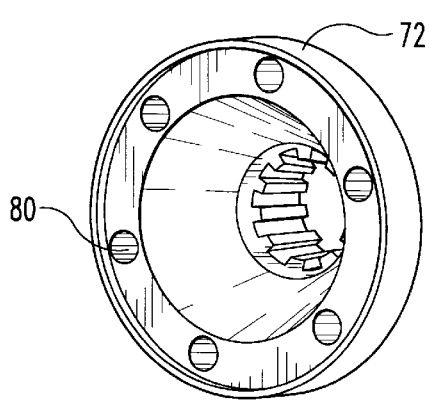
FIG. 29A is a front perspective view of a half shaft/hub adapter flange of the present invention.
Figure 29B:
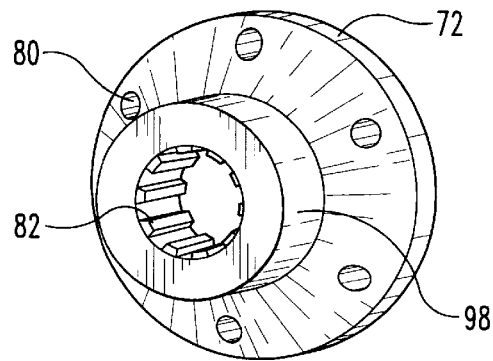
FIG. 29B is a rear perspective view of the half shaft/hub adapter flange of FIG. 29A.

Referring to FIGS. 29A–B, the half shaft/hub adapter flange 72 is illustrated, in which it can be seen that the adapter flange 72 includes a series of circumferential holes 80 formed therethrough in order to facilitate mounting of the adapter flange 72 to the half shaft 60. The half shaft side of the adapter flange 72 is illustrated in FIG. 29A, while the hub side of the adapter flange 72 is illustrated in FIG. 29B.

It can be seen in FIG. 29 that the interior central cavity of the adapter flange 72 includes a series of female splines 82 which mount to complementary male splines 84 formed upon one end of a short shaft 86 (see FIG. 28) that is used to couple the adapter flange 72 to the hub 74. The hub end of the short shaft 86 includes another set of male spines 88 which mate with complementary female splines (not shown) formed within the interior of the hub 74. The short shaft 86 is held within a custom rear upright 90 which includes an internal bearing surface 92 to support rotation of the short shaft 86. The configuration of the upright 90 is illustrated in detail in FIGS. 31–34.

Figure 30:
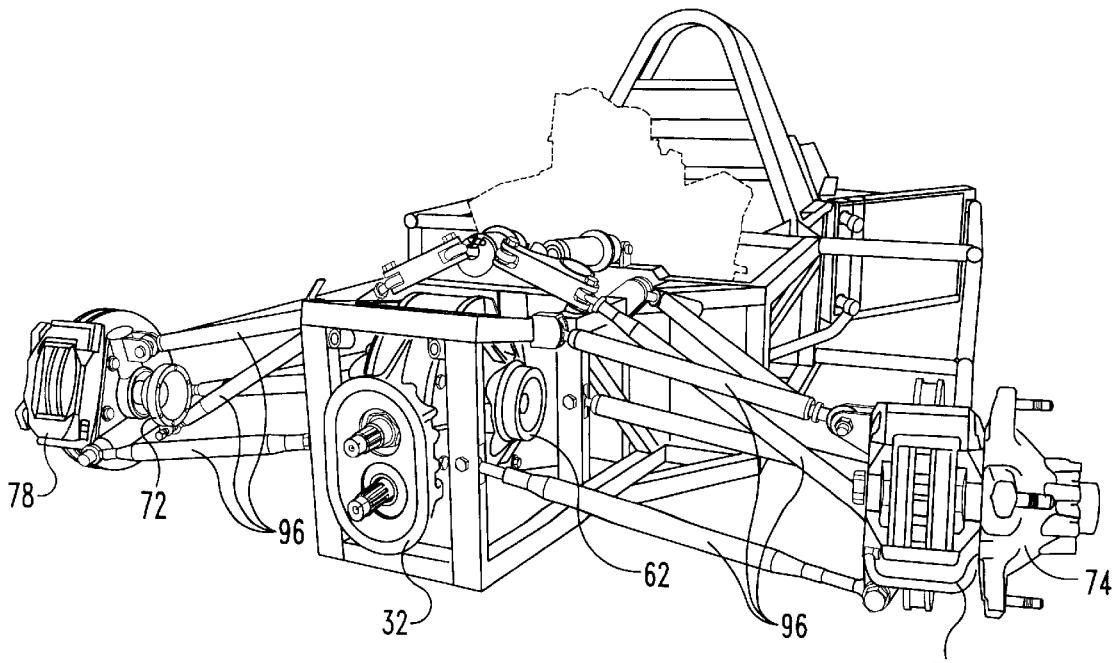
FIG. 30 is a perspective view of the driveline of the present invention mounted to the rear of the tubular chassis of the present invention.
Figures 31, 32:
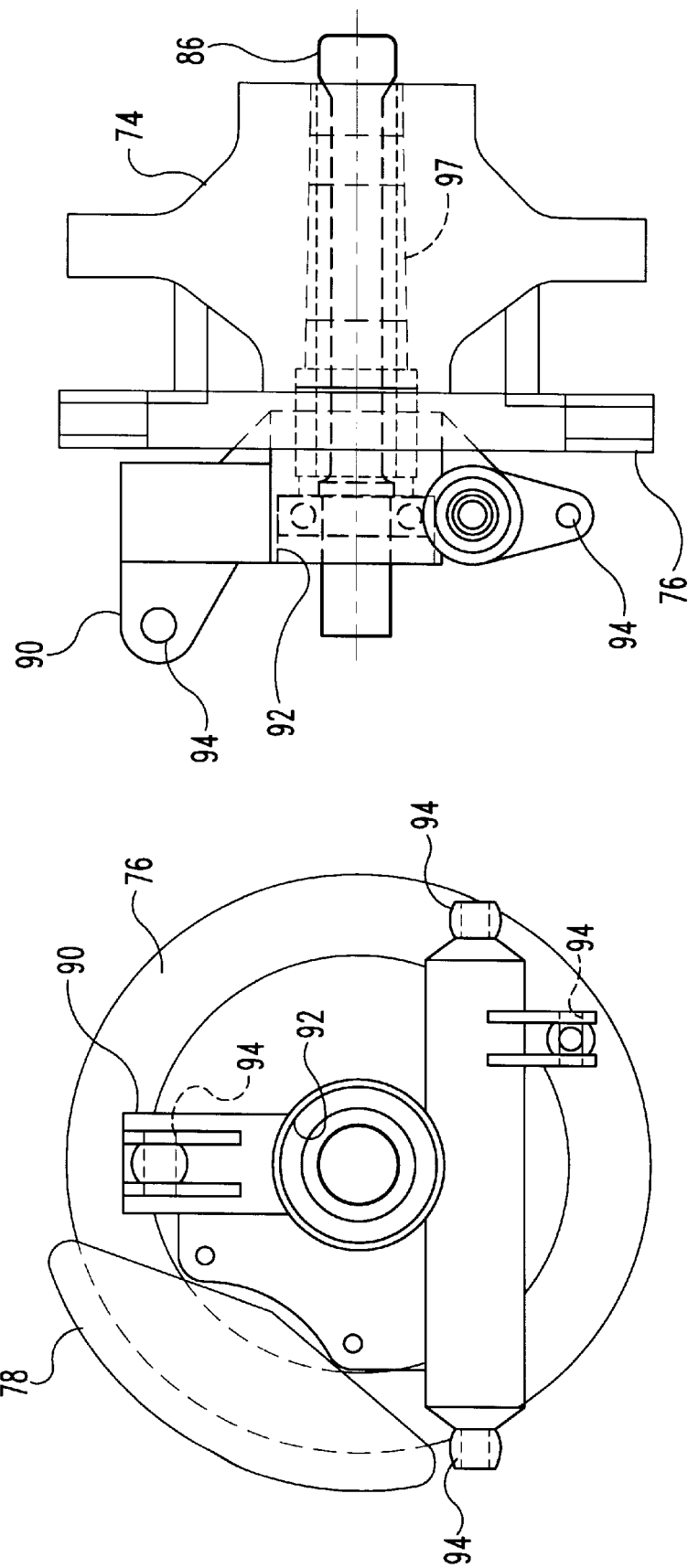
FIG. 31 is a side elevational view of a rear upright of the present invention mounted to a braking system.
FIG. 32 is an end elevational view of the rear upright and braking system of FIG. 31.
Figure 34:
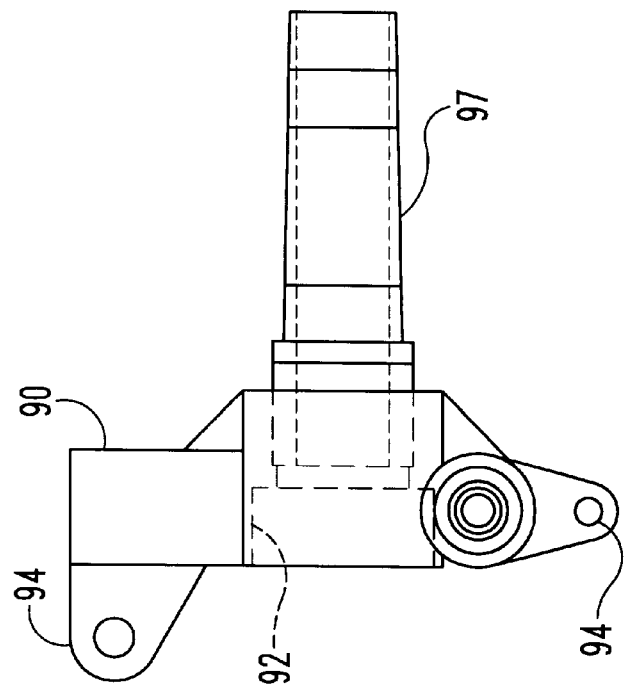
FIG. 34 is an end elevational view of the rear upright of FIG. 31.
Figure 33:
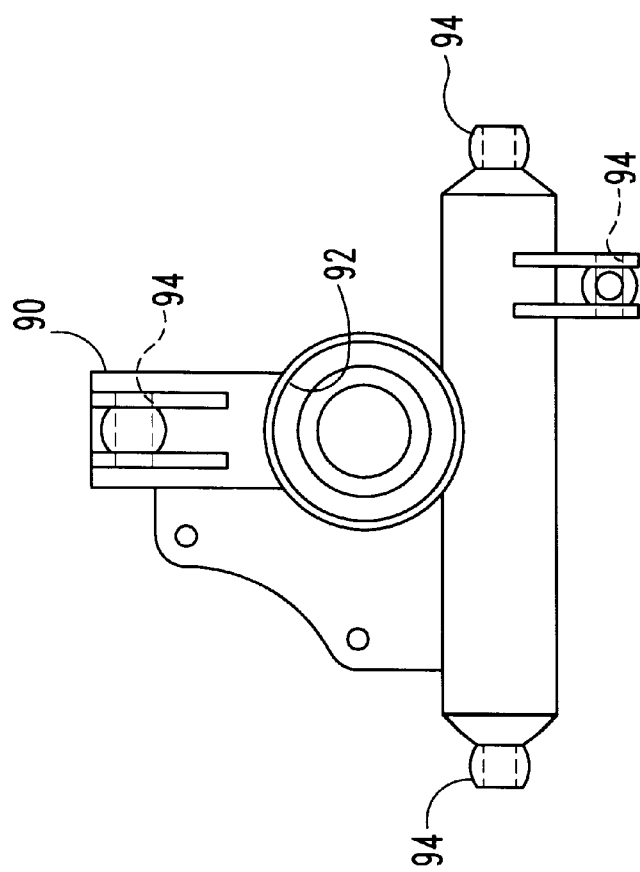
FIG. 33 is a side elevational view of the rear upright of FIG. 31.

As seen in FIGS. 31–34, the upright 90 is coupled to the hub 74 and provides a central passage therethrough having an internal bearing surface 92 for rotation of the short shaft 86 and an external bearing surface 97 for rotation of the hub 74. The upright 90 further includes a plurality of connection points 94 for coupling the upright 90 to the various suspension components, such as A-arms 96 (see FIG. 30). Therefore, the upright 90 is coupled to the car by means of the suspension components 96, and the hub 74 is coupled to the upright 90 and rotates upon the external bearing surface 97. Referring once again to FIG. 29B, the surface 98 exterior to the splined surface 82 of the adapter flange 72 rides within the bearing surface 92. Because of the coupling between the short shaft 86 and the hub 74, rotation of the short shaft 86 causes the hub 74 to rotate with respect to the stationary upright 90.

Figure 41:
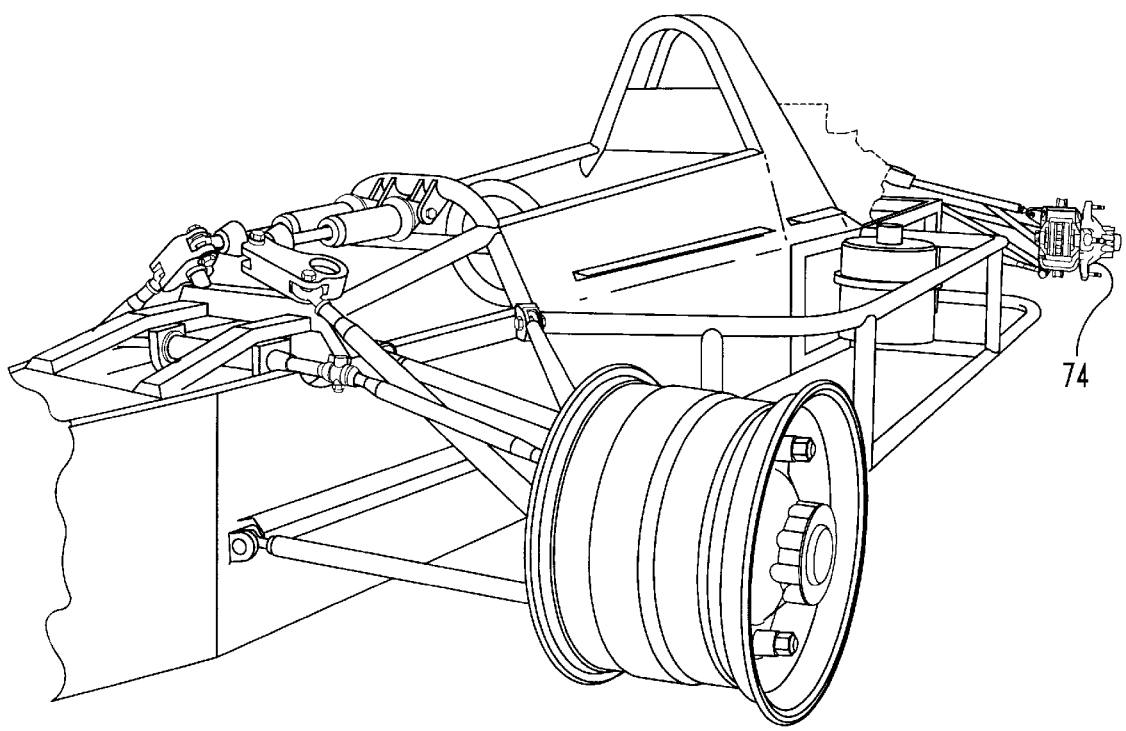
FIG. 41 is a perspective view of the tubular chassis and stressed steel skin of the present invention, showing a front corner of the race car.

FIGS. 30 and 35–40 illustrate various views of a partially assembled rear end of the race car of the present invention, without the half shafts 60 mounted thereto. FIG. 41 is a perspective view of a front corner of the race car of the present invention.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed:

1. A race car, comprising:
   a frame;
   an engine attached to the frame, the engine having a crankshaft extending therefrom;
   an engine plate coupled to the frame and having a first hole therethrough for passage of the engine crankshaft;
   a transmission mounting plate coupled to the engine plate and having a second hole therethrough substantially aligned with the first hole of the engine plate;
   a transmission mounted to the transmission mounting plate and having a transmission input shaft and a transmission output shaft, wherein the transmission input shaft extends through the second hole and is operatively coupled to the engine crankshaft;
   an adaptor coupled to the transmission and surrounding the transmission output shaft, the adaptor having an internal cylindrical bearing surface;
   a rear end mounted to the adaptor and having a rear end input shaft surrounded by the adaptor;
   a drive coupler coupled to the transmission output shaft and to the rear end input shaft and disposed within the adaptor for rotation within the internal cylindrical bearing surface; and
   at least one driveline stiffening plate mounted to the transmission mounting plate and to the rear end, whereby flexing between the transmission and the rear end is substantially reduced.

2. The race car of claim 1, wherein the adaptor comprises:
   a central cylindrical member having a hollow internal passage defining the internal cylindrical bearing surface;
   a first flange formed on a first end of the central member and configured for coupling to the transmission, wherein the transmission output shaft extends into the hollow internal passage; and
   a second flange formed on a second end of the central member and configured for coupling to the rear end, wherein the rear end input shaft extends into the hollow internal passage.

3. The race car of claim 2, wherein the drive coupler comprises:
   a cylindrical member having a hollow internal passage and a first end and a second end;
   wherein the hollow internal passage exhibits a first configuration at the first end and a second, different configuration at the second end.

4. The race car of claim 3, wherein the first configuration comprises a 1⅜" female 10-spline surface and the second configuration comprises a 1¼" female 10-spline surface.

5. The race car of claim 1, wherein the at least one driveline stiffening plate comprises two driveline stiffening plates.

6. A race car, comprising:

a frame;

an engine attached to the frame, the engine having a crankshaft extending therefrom;

a transmission coupled to the frame at a first location and having a transmission input shaft and a transmission output shaft, wherein the transmission input shaft is operatively coupled to the engine crankshaft;

a rear end coupled to the transmission and having a rear end input shaft operatively coupled to the transmission output shaft, wherein the transmission output shaft and the rear end input shaft are substantially coaxial; and at least one driveline stiffening plate coupled to the frame at a second location adjacent the first location and further coupled to the rear end, whereby flexing between the transmission and the rear end is substantially reduced;

wherein the rear end is not mounted to the frame except through the at least one driveline stiffening plate.

7. The race car of claim 6, further comprising:

an engine plate coupled to the frame and having a first hole therethrough for passage of the engine crankshaft;

a transmission mounting plate coupled to the engine plate and having a second hole therethrough substantially aligned with the first hole of the engine plate;

wherein the first and second locations are on the transmission mounting plate.

8. The race car of claim 6, further comprising:

an adaptor having a first end coupled to the transmission and surrounding the transmission output shaft, a second end coupled to the rear end and surrounding the rear end input shaft, and an internal cylindrical bearing surface.

9. The race car of claim 8, wherein the adaptor comprises:

a central cylindrical member having a hollow internal passage defining the internal cylindrical bearing surface;

a first flange formed on a first end of the central member and configured for coupling to the transmission, wherein the transmission output shaft extends into the hollow internal passage; and a second flange formed on a second end of the central member and configured for coupling to the rear end, wherein the rear end input shaft extends into the hollow internal passage.

10. The race car of claim 8, further comprising:

a drive coupler coupled to the transmission output shaft and to the rear end input shaft and disposed within the adaptor for rotation within the internal cylindrical bearing surface.

11. The race car of claim 10, wherein the drive coupler comprises:

a cylindrical member having a hollow internal passage and a first end and a second end;

wherein the hollow internal passage exhibits a first configuration at the first end and a second, different configuration at the second end.

12. The race car of claim 11, wherein the first configuration comprises a 1⅜" female 10-spline surface and the second configuration comprises a 1¼" female 10-spline surface.

13. The race car of claim 6, wherein the at least one driveline stiffening plate comprises two driveline stiffening plates.

* * * * *

UNITED STATES PATENT AND TRADEMARK OFFICE
CERTIFICATE OF CORRECTION

PATENT NO. : 6,085,859
DATED : July 11, 2000
INVENTOR(S) : Alderson

Page 1 of 1

It is certified that error appears in the above-identified patent and that said Letters Patent is hereby corrected as shown below:

Column 4,
Line 36, please change "comer" to --corner --.

Column 8,
Line 4, please change "comer" to -- corner --.

Signed and Sealed this

Fourth Day of December, 2001

Attest:

NICHOLAS P. GODICI
Attesting Officer
Acting Director of the United States Patent and Trademark Office